United States Patent
Hanada et al.

(10) Patent No.: US 6,915,782 B2
(45) Date of Patent: Jul. 12, 2005

(54) CONTROL APPARATUS FOR HYBRID VEHICLE

(75) Inventors: Kohei Hanada, Utsunomiya (JP); Manabu Niki, Utsunomiya (JP); Masanobu Asakawa, Utsunomiya (JP); Minoru Suzuki, Simotsuga-gun (JP); Teruo Wakashiro, Shioya-gun (JP); Tomohiro Nishi, Shioya-gun (JP); Takahiro Yonekura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/873,233

(22) Filed: Jun. 23, 2004

(65) Prior Publication Data

US 2005/0003926 A1 Jan. 6, 2005

(30) Foreign Application Priority Data

Jul. 4, 2003 (JP) .................................. 2003-192308
Jul. 4, 2003 (JP) .................................. 2003-192314

(51) Int. Cl.$^7$ ............................ F02B 63/04; B60K 5/08
(52) U.S. Cl. ............................... 123/399; 123/2; 477/3
(58) Field of Search ........................ 123/2, 399; 477/3

(56) References Cited

U.S. PATENT DOCUMENTS

| 2003/0176256 A1 | * | 9/2003 | Kamichi et al. | ................ | 477/5 |
| 2004/0216714 A1 | * | 11/2004 | Tayama et al. | ............. | 123/276 |
| 2005/0003925 A1 | * | 1/2005 | Wakashiro et al. | ............. | 477/2 |
| 2005/0003927 A1 | * | 1/2005 | Asakawa et al. | ............... | 477/3 |

FOREIGN PATENT DOCUMENTS

| JP | 5-209678 | | 8/1993 | | |
| JP | 6-233411 | * | 8/1994 | .......... | B60K/25/00 |
| JP | 7-172217 | | 7/1995 | | |
| JP | 8-275305 | | 10/1996 | | |
| JP | 9-112329 | | 4/1997 | | |
| JP | A-H09-163509 | | 6/1997 | | |
| JP | 9-191506 | | 7/1997 | | |
| JP | 11-93722 | | 4/1999 | | |
| JP | 11-200916 | | 7/1999 | | |
| JP | 2000-217204 | | 8/2000 | | |
| JP | 2000-337187 | | 12/2000 | | |
| JP | 2001-208177 | | 8/2001 | | |
| JP | 2003-176736 | | 6/2003 | | |

* cited by examiner

*Primary Examiner*—Hai Huynh
(74) *Attorney, Agent, or Firm*—Arent Fox, PLLC.

(57) ABSTRACT

A control apparatus for a hybrid vehicle which comprises an internal-combustion engine and a motor as a power source, and connects at least one of the internal-combustion engine and the motor to driving wheels of the vehicle through a transmission so as to transmit a driving force to the driving wheels, comprises: a target torque setting device which sets a target torque with respect to a crank end torque, which is a torque at the end of a crank shaft, of the power plant torque output from the power plant being the internal combustion engine and the motor, based on a change of accelerator pedal opening from fully opened to fully closed; and a torque allocation device which allocates the target torque corresponding to the accelerator pedal opening, to an engine torque instruction, being a required value with respect to the output torque from the internal combustion engine, and to a motor torque instruction, being a required value with respect to the output torque from the motor. The generation of torque fluctuations which are not expected by the occupants of the vehicle are suppressed, and a torque which unerringly reflects the driver's intention is output.

10 Claims, 15 Drawing Sheets

CONTROL APPARATUS FOR HYBRID VEHICLE

BACKGROUND OF THE INVENTION

1. Field of the Invention

The present invention relates to a control apparatus for a hybrid vehicle which is mounted in a hybrid vehicle propulsion driven by jointly using an internal-combustion engine and a motor, and wherein the driving force from at least one of the internal-combustion engine and the motor is transmitted to the driving wheels.

Priority is claimed on Japanese Patent Application No. 2003-192308 and No. 2003-192314, both filed Jul. 4, 2003, the contents of which are incorporated herein by reference.

2. Description of Related Art

Conventionally, for example, in a hybrid vehicle which comprises an internal-combustion engine and a motor as a power source and wherein the driving force from at least one of the internal-combustion engine and the motor is transmitted to the driving wheels for propulsion, a control apparatus for a hybrid vehicle has been well known which calculates the throttle opening for minimizing the fuel consumption of the internal-combustion engine with respect to the rotation frequency of the input shaft of the transmission, and based on this throttle opening and the accelerator operating amount of a driver, allocates the torque required by the power plant (that is, the internal-combustion engine and the motor), to the engine torque required by the internal-combustion engine and to the motor torque required by the motor (for example, refer to Japanese Patent Application Unexamined Publication No. Hei 9-163509).

Incidentally, in the control apparatus for a hybrid vehicle according to an example of the above conventional technique, since the torque that is capable of being output from the motor fluctuates according to the charging state, temperature, and the like, of a power storage unit which transfers electrical energy to and from the motor, for example, there is concern that the torque output from the motor or the power plant (that is, the internal combustion engine and the motor) fluctuates even with the same accelerator operating amount, for example. Hence the driver's intention is not appropriately reflected in the traveling behavior of the vehicle, resulting in a deterioration of drivability. Furthermore, there is concern that a desired torque cannot be output from the motor and the power plant (that is, the internal combustion engine and the motor) simply by setting the torque allocation with respect to an engine torque instruction and a motor torque instruction according to the driver's accelerator operating amount, engine speed, speed of the vehicle (vehicle speed) and the like.

Moreover, for example, there is concern that when shifting from an executing state for fuel cut (F/C) which cancels the fuel supply to the internal-combustion engine during a regenerative operation of motor due to the accelerator operating amount of driver being a value of zero or in the vicinity of zero, to a F/C resetting state which restarts the fuel supply, the torque output from the power plant rapidly fluctuates (that is, increases), so that a change in the traveling behavior occurs which is not expected by the occupants of the vehicle. As a result, the drivability deteriorates.

SUMMARY OF THE INVENTION

The present invention has been made in view of the above situation, and it is an object thereof to provide a control apparatus for a hybrid vehicle which can suppress the generation of torque fluctuations which are not expected by the occupants of the vehicle, and can output a torque which unerringly reflects the driver's intention.

In order to solve the above problem and achieve the related object, according to one aspect of the present invention, there is provided a control apparatus for a hybrid vehicle which includes an internal-combustion engine and a motor as a power source, and connects at least one of the internal-combustion engine and the motor to driving wheels of the vehicle through a transmission so as to transmit a driving force to the driving wheels, comprising: a target torque setting device (for example, step S04 and step S05 in the embodiment) which sets a target torque with respect to a crank end torque, which is a torque at the end of a crank shaft, of the power plant torque output from the power plant made up of the internal combustion engine and the motor (for example, target torque TQAPOBJ of the embodiment), based on a change of accelerator pedal opening from fully opened to fully closed; and a torque allocating device (for example, torque allocation calculating section 58 in the embodiment) which allocates the target torque corresponding to the accelerator pedal opening, to an engine torque instruction, which is a required value with respect to the output torque from the internal combustion engine, and to a motor torque instruction, which is a required value with respect to the output torque from the motor.

According to a control apparatus for a hybrid vehicle of the above construction, for example, by making the ratio of the target torque to the change of the accelerator pedal opening associated with a driver's accelerator operating amount one to one, and by smoothly changing the target torque, then even during resetting the fuel cut which restarts the fuel supply from the executing state of the fuel cut which temporarily cancels the fuel supply to the internal combustion engine, so as to restart the internal combustion engine, it is possible to prevent a torque difference occurring whereby the power plant torque changes rapidly, and to reflect the driver's intention with respect to the traveling behavior of the vehicle appropriately with good reproducibility, so that the vehicle operability can be improved.

Preferably, a control apparatus for a hybrid vehicle of the present invention further comprises an electronically controlled throttle that controls a throttle valve according to the engine torque instruction.

According to a control apparatus for a hybrid vehicle of the above construction, by operation of the throttle valve by the electronically controlled throttle, it is possible to output an output torque with high accuracy according to the engine torque instruction, from the internal combustion engine, thus enabling the responsiveness of the internal combustion engine to be improved.

Preferably, a control apparatus for a hybrid vehicle of the present invention further comprises an engine torque setting device which sets the torque capable of being output from the internal combustion engine based on at least one of the following pieces of information: atmospheric pressure, intake air temperature, ignition timing, air-fuel ratio and fuel properties (for example, step S01 in the embodiment).

According to a control apparatus for a hybrid vehicle of the above construction, when allocating the target torque corresponding to the accelerator pedal opening, to the engine torque instruction and to the motor torque instruction, it is possible to appropriately set the engine torque instruction.

Preferably, a control apparatus for a hybrid vehicle of the present invention further comprises a power storage unit which transfers electric energy between it and the motor (for example, the battery 3 in an embodiment), and a motor torque setting device which sets the torque capable of being output from the motor based on at least any one of the following pieces of information: the state of charge of the power storage unit, the temperature of a high voltage electrical system comprising the motor and the power storage unit, and the existence or nonexistence of an abnormal state in the high voltage electrical system (for example, step S06 in the embodiment).

According to a control apparatus for a hybrid vehicle of the above construction, when allocating the target torque corresponding to the accelerator pedal opening, to the engine torque instruction and to the motor torque instruction, it is possible to appropriately set the motor torque instruction.

Preferably, a control apparatus for a hybrid vehicle of the above construction further comprises a target torque correction device which reduces the target torque at the fully opened side of the accelerator pedal opening in the case where the torque capable of being output from the motor set by the motor torque setting device, is a value that limits the torque capable of being output during the power running operation of the motor, and increases the target torque at the fully closed side of the accelerator pedal opening in the case where the torque capable of being output from the motor set by the motor torque setting device, is a value that limits the torque capable of being output during the power regenerative operation of the motor (for example, step S08 and step S11 in the embodiment).

According to a control apparatus for a hybrid vehicle of the above construction, it is possible to appropriately set a target torque for the torque capable of being output from the power plant being the internal combustion engine and the motor.

Preferably, a control apparatus for a hybrid vehicle of the above construction further comprises a target torque resetting device which, in the case where the target torque is corrected by the target torque correction device, sets the accelerator pedal opening and the target torque to a predetermined correspondence relationship of one to one, changing smoothly, in a partway open region between the fully opened side of the accelerator pedal opening and the fully closed side (for example, step S12 of the embodiment).

According to a control apparatus for a hybrid vehicle of the above construction, in either one of the cases where the target torque is changed to decrease at the fully opened side of the accelerator pedal opening, and where the target torque is changed to increase at the fully closed side of the accelerator pedal opening, the target torque resetting device sets the accelerator pedal opening and the target torque to a predetermined correspondence relationship of one to one, changing smoothly. Therefore, in the partway open region of the accelerator pedal opening, the target torque is set so as to maintain a predetermined correspondence relationship with respect to the accelerator pedal opening associated with a driver's intention to travel for example. Hence, it is possible to appropriately reflect the driver's intention in the traveling behavior of the vehicle.

In order to solve the above problem and achieve the related object, another aspect of the present invention is to provide a control apparatus for a hybrid vehicle which includes an internal-combustion engine and a motor as a power source, and connects at least one of the internal-combustion engine and the motor to driving wheels of the vehicle through a transmission so as to transmit a driving force to the driving wheels, comprising: a target torque ratio setting device (for example, step S04 in the embodiment) which sets a target torque ratio (for example, target torque ratio DISAPTQ in the embodiment) with respect to a crank end torque, which is a torque at the end of a crank shaft, of a power plant torque output from a power plant made up of the internal combustion engine and the motor, based on a change of an accelerator pedal opening from fully opened to fully closed, where the target value of the crank end torque when the accelerator pedal opening is fully open is 100%, and the target value when the accelerator pedal opening is fully closed is 0%; a target torque setting device (for example, step S05 of the embodiment) which sets a target torque (for example, target torque TQAPOBJ in the embodiment) corresponding linearly to the target torque ratio, which changes from 0% to 100% based on a target maximum torque (for example, the target torque when the accelerator pedal is fully open TQAPMAX), which is the target value of the crank end torque when the accelerator pedal opening is fully opened, and a target minimum torque (for example, the target torque when the accelerator pedal is fully closed TQAPMIN), which is the target value of the crank end torque when the accelerator pedal opening is fully closed; and a torque allocation device (for example, the torque allocation calculating section 58 in the embodiment) which allocates the target torque according to the accelerator pedal opening to an engine torque instruction, which is a required value with respect to the output torque from the internal combustion engine, and to a motor torque instruction, which is a required value with respect to the output torque from the motor.

According to a control apparatus for a hybrid vehicle with the above-described construction, for example by setting the engine torque instruction and the motor torque instruction by the linearly corresponding target torques, with respect to the target torque ratio which corresponds by a ratio of one to one with the change of the accelerator pedal opening associated with the driver's accelerator operation amount and changes smoothly, it is possible to control the internal combustion engine and the motor easily. Furthermore, even during fuel cut reversion when fuel supply is resumed to restart the internal combustion engine from the fuel cut operation state, during which the fuel supply to the internal combustion engine is temporarily stopped, for example, it is possible to prevent a torque difference occurring whereby the power plant torque changes rapidly, and to reflect the driver's intention with respect to the traveling behavior of the vehicle appropriately with good reproducibility, so that the vehicle operability can be improved.

Preferably, a control apparatus for a hybrid vehicle of the present invention further comprises a target maximum torque calculating device which sets a value obtained by adding an output capable maximum torque of the internal combustion engine which changes according to the engine speed (for example, all cylinder time maximum ENG torque TQE6MAX in the embodiment), and an output capable maximum torque of the motor which changes according to the motor speed (for example, WOT assist time motor maximum torque TQMWOT in the embodiment), to the target maximum torque (for example, step S40 in the embodiment).

According to a control apparatus for a hybrid vehicle of the above construction, it is possible to accurately calculate the target maximum torque, being the target value of the crank end torque when the accelerator pedal opening is fully opened.

Preferably, a control apparatus for a hybrid vehicle of the above construction further comprises an internal combustion engine maximum capable output torque calculating device which makes a predetermined correction to a maximum intake air volume of the internal combustion engine, which changes according to the engine speed, based on the atmospheric pressure and the intake air temperature, to calculate a maximum intake air weight, calculates a torque corresponding to the maximum intake air weight, and sets the value obtained by a predetermined correction to the torque based on the ignition timing and the air-fuel ratio, to the output capable maximum torque of the internal combustion engine (for example, step S21 to step S38 in the embodiment).

According to a control apparatus for a hybrid vehicle of the above construction, it is possible to accurately calculate the output capable maximum torque of the internal combustion engine.

Preferably, a control apparatus for a hybrid vehicle of the present invention further comprises a target minimum torque calculation device (for example, step S41 to step S62 of the embodiment) which calculates a target deceleration according to the transmission gear ratio and the vehicle speed, the transmission gear ratio and the engine speed, or the vehicle speed, and which sets a value obtained by performing a calculation using, the transmission gear ratio, the transmission efficiency and the vehicle running resistance in the target deceleration, to the target minimum torque.

According to a control apparatus for a hybrid vehicle of the above construction, it is possible to accurately calculate the target minimum torque, being the target value of the crank end torque when the accelerator pedal opening is fully closed.

DETAILED DESCRIPTION OF THE INVENTION

Hereunder is a description of a control apparatus for a hybrid vehicle according to an embodiment of the present invention with reference to the appended drawings.

Figure 1:
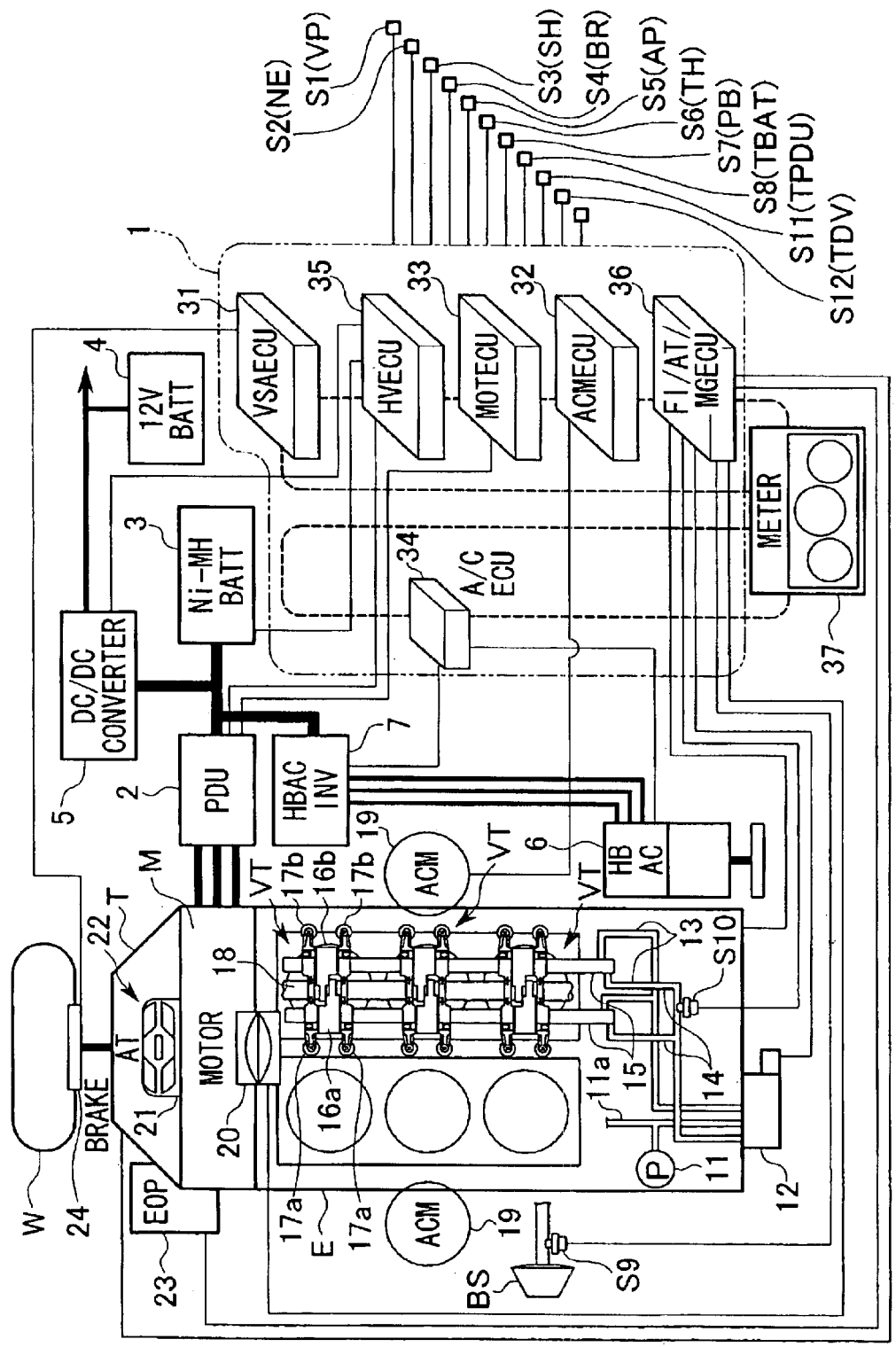
FIG. 1 is a block diagram of a control apparatus for a hybrid vehicle according to an embodiment of the present invention.

FIG. 1 shows a parallel hybrid vehicle according to the embodiment of this invention having a construction where an internal-combustion engine E, a motor M, and a transmission T are connected directly in series. The driving force of both the internal-combustion engine E and the motor M is transmitted, for example, from the transmission T such as an automatic transmission (AT) or manual transmission (MT),) to the driving wheels W of the vehicle, via a differential gear (not shown) which distributes the driving force between driving wheels W on the right and the left (front wheels or rear wheels). Moreover, when a driving force is transmitted from the driving wheel W side to the motor M side at the time of deceleration of the hybrid vehicle, the motor M functions as a generator to generate so-called regenerative braking, and the kinetic energy of the vehicle body is recovered as electrical energy.

The motor M, being for example a three-phase brushless DC motor or the like, is connected to a power drive unit (PDU) 2. The power drive unit 2 comprises, for example a PWM inverter involving pulse width modulation (PWM), installed with a bridge circuit being a bridge connected using a plurality of transistor switching elements, and is connected to a nickel-hydrogen battery (battery) 3 of a high voltage system which transfers the power for the motor M (the power supply which is supplied to the motor M during the power running operation (driving or assisting) of the motor M, or the regenerated power which is output from the motor M during the regenerative operation).

Moreover, the drive and regenerative operation are performed by the power drive unit 2 receiving control instructions from a control unit 1. That is, for example when driving the motor M, based on torque instructions input from the control unit 1, the power drive unit 2 converts the DC power output from the battery 3 into three-phase AC power and supplies this to the motor M. On the other hand, during the regenerative operation of the motor M, the three-phase AC power output from the motor M is converted into the DC power and the battery 3 is charged.

Furthermore, an auxiliary battery 4 of 12 volts for driving various accessories, is connected to the power drive unit 2 and the battery 3 in parallel via a downverter 5 which is a DC-DC converter. The downverter 5 is controlled by the control unit 1 and charges the auxiliary battery 4 by lowering the voltage of the power drive unit 2 or the battery 3.

Moreover, a crankshaft of the internal-combustion engine E is connected, for example through a belt or a clutch to a rotation shaft of an air conditioning motor (not shown) equipped in a hybrid air conditioning compressor (HBAC) 6. This air conditioning motor is connected to an air conditioning inverter (HBAC INV) 7. The air conditioning inverter 7 is connected in parallel to the power drive unit 2 and the battery 3, and under the control of the control unit 1, converts the DC power output from the power drive unit 2 and the battery 3 into three-phase AC power to supply to the air conditioning motor so as to drive control the hybrid air conditioning compressor 6.

That is, in the hybrid air conditioning compressor 6, the driving load, for example the discharge of the refrigerant, is variably controlled under the driving force from at least one of the internal-combustion engine E and the air conditioning motor during the power running operation of the air conditioning motor. Here, "hybrid" in the hybrid air conditioning compressor 6 means that it can be driven by either one of the internal-combustion engine E and the motor M.

Between the internal-combustion engine E and the air conditioning motor, there are for example, a crankshaft pulley integrally provided with the crankshaft of the internal-combustion engine E, a driving shaft pulley paired with the crankshaft pulley and integrally provided with a driving shaft connectable with the rotation shaft of the air conditioning motor through a clutch, and a belt spanning between the crankshaft pulley and the driving shaft pulley. That is, between the crankshaft pulley and the driving shaft pulley, the driving force is transmitted through the belt.

Moreover, the internal-combustion engine E is a so-called SOHC V6 cylinder engine, of a construction having three cylinders on one bank comprising a variable valve timing mechanism VT enabling a cylinder deactivation operation, and a construction having three cylinders on the other bank comprising a normal valve operating mechanism (not shown) which does not perform the cylinder deactivation operation. Furthermore, the three cylinders enabling the cylinder deactivation operation have a construction such that respective two inlet valves and two exhaust valves are able to maintain the closed state by means of the variable timing mechanism VT, via an oil pressure pump 11, a spool valve 12, a cylinder deactivation side path 13, and a cylinder deactivation cancellation side path 14.

That is, the internal-combustion engine E may be switched between three cylinders operation (cylinder deactivation operation) in the state such that the three cylinders on one side bank are deactivated, and six cylinders operation (all cylinders operation) such that all six cylinders on both side banks are driven.

Specifically, if operating oil being supplied from the oil pressure pump 11 through the lubrication system piping 11a to the engine lubrication system is partially supplied via the spool valve 12 comprising a solenoid controlled by the control unit 1, to the cylinder deactivation side path 13 on the bank capable of cylinder deactivation operation, a cam lift rocker arm 16a (16b) and valve drive rocker arms 17a (17b) which are supported on the respective rocker shafts 15 and were integrally driven, are able to be driven separately. Therefore, the driving forces of the cam lift rocker arms 16a and 16b driven by the rotation of the cam shaft 18 are not transmitted to the valve drive rocker arms 17a and 17b, so that the inlet valves and the exhaust valves remain in the closed state. Accordingly the cylinder deactivation operation where the inlet valves and the exhaust valves of the three cylinders become in the closed state may be performed.

The internal-combustion engine E is mounted via a damping device (ACM: Active Control Engine Mount) 19 onto the vehicle so that the damping device 19 can suppress the generation of vehicle vibration accompanied with the operating state of the internal-combustion engine E, that is the switching of the three cylinders operation (cylinder deactivation operation) and the six cylinders operation (all cylinders operation).

Moreover, this internal-combustion engine E comprises an electronic throttle control system (ETCS) 20 which electronically controls a throttle valve (not shown).

The ETCS 20 drives an ETCS driver according to the throttle opening calculated in the control unit 1 based for example on the accelerator pedal opening related to the operating amount of the accelerator pedal (not shown) by a driver, the operating state of the vehicle such as the vehicle travelling speed (vehicle speed) VP or the engine speed NE, and on the torque allocation between the internal-combustion engine E and the motor M, so as to directly control the throttle valve.

For example the transmission T being the automatic transmission (AT) is constructed to comprise a torque converter 22 equipped with a lock-up clutch (LC) 21, and an electric oil pump 23 which generates the oil pressure for drive controlling the torque converter 22 and for the shifting operation of the transmission T.

The electric oil pump 23 is drive controlled by the control unit 1 with the power supply from the battery 3.

The torque converter 22 transmits the torque by a spiral flow of the operating oil (ATF: Automatic Transmission Fluid) enclosed inside. In an LC_OFF state where the engagement of the lock-up clutch 21 is cancelled, the torque is transmitted (for example, amplification transmission) from the rotation shaft of the motor M to the input shaft of the transmission T via the operating oil.

Furthermore, in an LC_ON state where the lock-up clutch 21 is set up in the engagement state, the rotation driving force is directly transmitted from the rotation shaft of the motor M to the input shaft of the transmission T and not via the operating oil.

Moreover, a booster BS is linked to the brake pedal (not shown). A master power internal negative pressure sensor S9 which detects the brake master power internal negative pressure is provided in the booster BS.

Moreover, the driving wheel W comprises a brake device 24. The brake device 24 suppresses the generation of rapid behavioral change of the vehicle by control of the control unit 1. For example, it prevents slipping of the driving wheel W on a slippery road surface or the like, suppresses side slip such as oversteering or understeering, prevents the driving wheel W from being in a locked state during braking, ensures the desired driving force and the steering performance of the vehicle, stabilizes the posture of the vehicle, and assists with travelling by means of a creep force, for example, prevents the vehicle from moving backward on a slope when deactivating the internal-combustion engine E.

Inputs to the control unit 1 are: for example: a detection signal from a vehicle speed sensor S1 which detects the travelling speed of the vehicle VP, a detection signal from an engine speed sensor S2 which detects the engine speed NE, a detection signal from a shift position sensor S3 which detects the shift position SH of the transmission T, a detection signal from a brake switch S4 which detects the operating state BR of the brake (Br) pedal, a detection signal from an accelerator pedal opening sensor S5 which detects the accelerator pedal opening AP according to the operating amount of the accelerator pedal, a detection signal from a throttle opening sensor S6 which detects the throttle opening TH, a detection signal from an intake pipe pressure sensor S7 which detects the intake pipe pressure PB, a detection signal from a battery temperature sensor S8 which detects the temperature TBAT of the battery 3, a detection signal from the master power internal negative pressure sensor S9, a detection signal from a POIL sensor S10 which detects the oil pressure of the cylinder deactivation cancellation side path 14 when deactivating the cylinders, a detection signal from a PDU temperature sensor S11 which detects the temperature TPDU of the power drive unit 2, and a detection signal from a DV temperature sensor S12 which detects the temperature TDV of the downverter 5.

Moreover, the control unit 1 comprises: for example: a VSA (Vehicle Stability Assist) ECU 31 which drive controls the brake device 24 to stabilize the behavior of the vehicle, an ACMECU 32 which drive controls the damping device 19 to suppress the generation of car body vibration caused by the operating state of the internal-combustion engine E, a MOTECU 33 which controls the driving and the regenerative operation of the motor M, an A/CECU 34 which drive controls the air conditioning hybrid air conditioning compressor 6 and the air conditioning inverter 7, and an HVECU 35 which monitors and protects the high voltage electrical equipment-system comprising for example the power drive unit 2, the battery 3, the downverter 5, and the motor M, and controls the operation of the power drive unit 2 and the downverter 5, and a FI/AT/MGECU 36 The respective VSAECU 31 to 36 are mutually connected communicably. The respective ECUs 31 to 36 are connected to a meter 37 comprising instruments which display the amount of the respective types of states.

Figure 2:
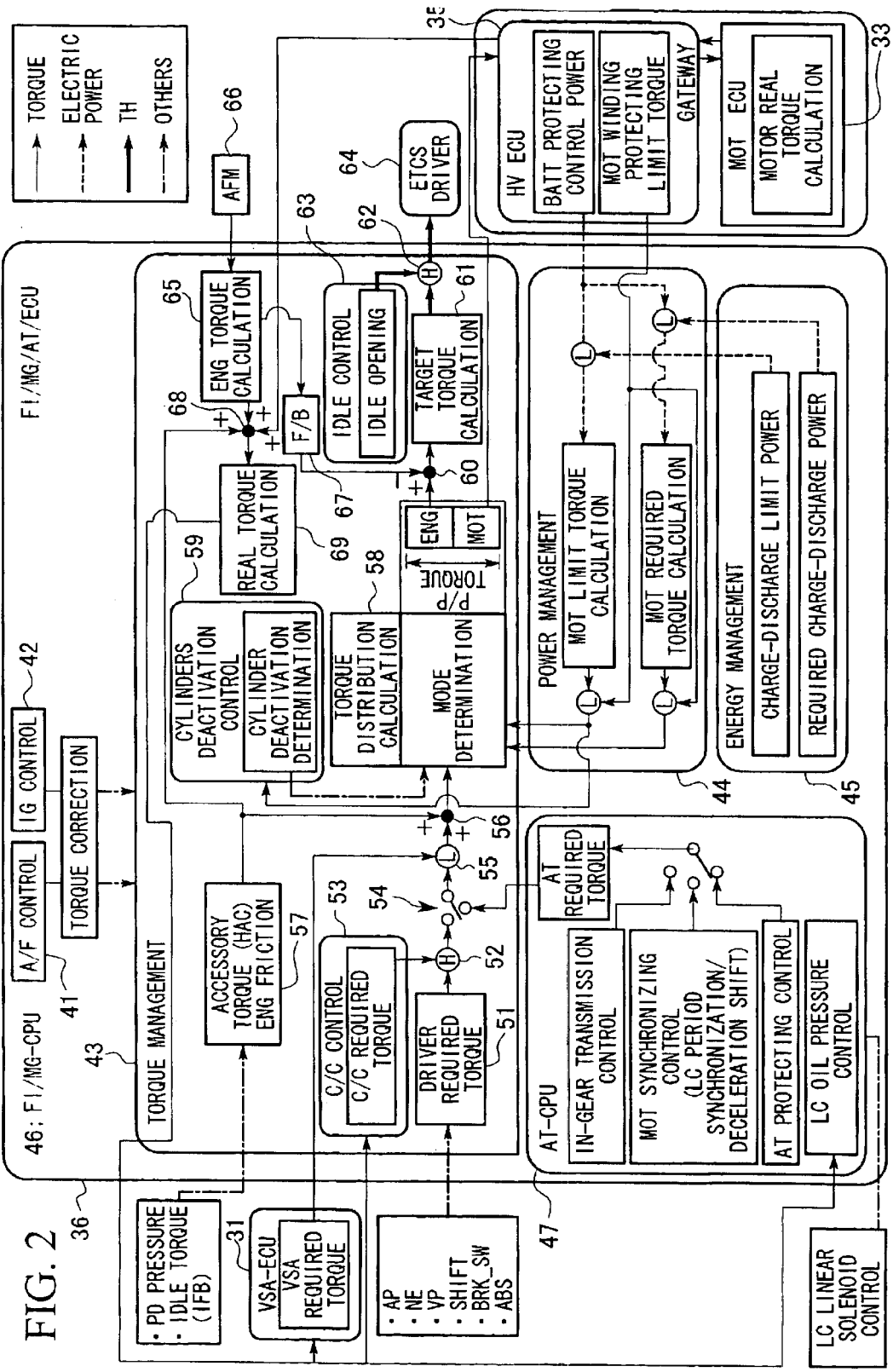
FIG. 2 is a functional block diagram of the control unit shown in FIG. 1.

For example, as shown in FIG. 2, the FI/AT/MGECU 36 comprises; a FI/MG-CPU 46 installed with an A/F (air/fuel ratio) control unit 41 and an IG (ignition) control unit 42 which control the fuel supply to and the ignition timing of the internal-combustion engine E, a torque management section 43, a power management section 44, and an energy management section 45; and for example an AT-CPU 47 which controls the shifting operation of the transmission T, the operating state of the lock-up clutch 2, and the like.

In the torque management section 43, a driver required torque calculating section 51 calculates the torque value required by a driver of the vehicle (driver required torque) depending on the operating amount of the accelerator by the driver, for example based on respective detection signals from the accelerator pedal (AP) opening, the engine speed NE, the vehicle travelling speed VP, the shift position SH, the operating state of a brake pedal BRK_SW, and the operating state ABS of an antilock brake system which prevents the driving wheels W from being locked during vehicle braking by the brake device 24, and outputs this torque value to a first torque selecting section 52.

Moreover, a C/C (cruise control) unit 53 calculates the torque value (C/C required torque) targeted during the travel control satisfying predetermined traveling conditions previously set according to the input operation of the driver, that is cruise control, for example, such as the constant speed travelling control which controls the internal-combustion engine E and the motor M so that the vehicle travelling speed VP detected in a vehicle speed sensor S1 becomes the target vehicle speed which is the target value of the travelling speed of the vehicle, and follow travel control for following a preceding vehicle while maintaining a predetermined vehicular gap, and outputs the torque value to the first torque selecting section 52.

The first torque selecting section 52 selects the greater torque value of the driver required torque or the C/C required torque, and outputs to the torque switching section 54. Therefore, for example even during cruise control, in the case where the driver required value according to the accelerator operation of the driver of the vehicle is over the C/C required torque, the torque according to the driver required value is output.

The torque switching section 54 selects either one of the torque value input from the first torque selecting section 52 and the AT required value input from the AT-CPU 47, and outputs to a second torque selecting section 55.

The AT-CPU 47 selects either one of the torque values as the AT required torque among, for example; a torque value set during the shifting operation of the transmission T, a torque value targeted when performing synchronizing control which synchronize the period of the input shaft of the transmission T and the rotation frequency of the motor M during driving the lock-up clutch 21 or shifting the speed such as shifting down, and a torque value set during protection control of the transmission T in the case where a driver operates the accelerator pedal and the brake pedal at the same time.

Moreover, the AT-CPU 47 electronically controls the oil pressure which drives the lock-up clutch 21 by an LC linear solenoid, and it is possible to set the operation, in addition to the LC_ON state where the lock-up clutch 21 is in the engagement state and the LC_OFF state where the engagement is cancelled, to an intermediate state which generates an appropriate smoothness in the lock-up clutch 21.

The second torque selecting section 55 selects the smaller torque value of the torque value input from the torque switching section 54 and the VSA required torque input from the VSAECU 31, then sets this torque value as a torque of the crankshaft (crankshaft torque), that is the target torque value with respect to the actual rotation of the driving wheels W, and outputs to a first adding section 56.

Moreover, an auxiliary torque-ENG friction calculating section 57 calculates, for example the auxiliary torque (HAC) required for driving the accessories based on the protrusive pressure (PD) of the air conditioner, calculates the torque value in relation to the engine (ENG) friction of the internal-combustion engine E based on the increased amount of the engine friction in a low temperature state compared to a standard for the engine friction value after termination of warming up of the internal-combustion engine E, and outputs to the first adding section 56.

The first adding section 56 sets the value obtained by adding the crank terminal torque and the torque value input from the auxiliary torque-ENG friction calculating section 57, as the power plant (P/P) torque which is the target torque with respect to the torque output from the power plant (that is, the internal-combustion engine E and the motor M), and outputs to a torque allocation calculating section 58.

The torque allocation calculating section 58 selects the required torque mode for instructing the predetermined operating state of the internal-combustion engine E and the motor M based on the cylinder deactivation determination output from the cylinder deactivation control unit 59 for determining whether the cylinder deactivation operation of the internal-combustion engine E should be executed or not, and the limit torque and the required torque with respect to the motor M output from the power management section 44, and according to the selection result, sets the allocation of the power plant torque (P/P) with respect to the respective torque instructions of the internal-combustion engine E and the motor M.

To the cylinder deactivation control unit 59 is input the limit torque for the motor M output from the power management section 44 described later, and according to the limit torque for the motor M, the cylinder deactivation control unit 59 determines whether the cylinder deactivation operation should be executed or not.

The power management section 44 calculates, for example the motor (MOT) limit torque based on the smaller power of the battery (BATT) protecting limit power output from the HVECU 35 and the charge-discharge limit power output from the energy management section 45, then sets the smaller one of the calculated motor limit torque and the motor (MOT) winding protecting limit torque output from the HVECU 35 as the limit torque, and outputs to the torque allocation calculating section 58 and the cylinder deactivation control unit 59.

Moreover, the power management section 44 calculates, for example the motor (MOT) limit torque based on the smaller power of the battery (BATT) protecting limit power output from the HVECU 35 and the required charge-discharge power output from the energy management section 45, then sets the smaller one of the calculated motor limit torque and the motor (MOT) winding protecting limit torque output from the HVECU 35 as the required torque, and outputs to the torque allocation calculating section 58.

The charge-discharge limit power and the required charge-discharge power output from the energy management section 45 are, for example the limited amount and the required amount with respect to charge and discharge set according to the state of charge of the battery 3 and the auxiliary battery 4.

Moreover, the battery (BATT) protecting limit power output from the HVECU 35 is, for example the limit value of the output power of the battery 3 set according to the temperature state of the battery 3, the auxiliary battery 4, and the other high voltage electrical equipment. The motor (MOT) winding protecting limit torque is the limit value of the output torque of the motor M set according to the temperature state of the motor M.

The torque instruction of the internal-combustion engine E calculated by the torque allocation calculating section 58 is input into a subtracting section 60. The subtracting section 60 inputs the value obtained by subtracting the torque value input from the feedback (F/B) processing section 67 described later from the torque instruction of the internal-combustion engine E, to a target TH calculating section 61. The target TH calculating section 61 calculates the target value for the electronic throttle opening TH in relation to the drive of the ETCS driver based on the input torque value, and outputs to a third torque selecting section 62.

The third torque selecting section 62 selects the greater throttle opening value of the target value of the electronic throttle opening TH input from the target TH and the idle opening output from the idle control unit 63, and outputs this throttle opening value to the ETCS driver 64.

The idle opening output from the idle control unit 63 is, for example, a limit value with respect to the throttle opening TH for preventing the engine speed NE from being less than the predetermined rotation frequency during the idle operation of the internal-combustion engine E.

Moreover, to the ENG torque calculating section 65 in the torque management section 43 is input a detection signal intake air amount (or supplied oxygen amount) of the internal-combustion engine E detected by an airflow meter (AFM) 66. The ENG torque calculating section 65 calculates the ENG torque output from the internal-combustion engine E based on the detection value of the intake air amount, and outputs to the feed back (F/B) processing section 67 and a second adding section 68.

The feed back (F/B) processing section 67, with respect to the torque instruction of the internal-combustion engine E calculated in the torque allocation calculating section 58, corrects for calculation errors of ENG torque based for example on the detection value of the airflow meter 66, response characteristic or aged deterioration of the internal-combustion engine E, performance irregularities during mass production of the internal-combustion engine E and the like, by feed back processing, and inputs the ENG torque calculated in the ENG torque calculating section 65 to the subtracting section 60.

A third adding section 68 inputs the torque value obtained by adding; the ENG torque calculated in the ENG torque calculating section 65, the torque value input from the auxiliary torque-ENG friction calculating section 57, and the motor real torque input from the MOTECU 33, to the real torque calculating section 69. The real torque calculating section 69 calculates the real torque value which is actually output from the power plant (that is, the internal-combustion engine E and the motor M) based on the input torque value.

To the MOTECU 33 is input the torque instruction of the motor M calculated by the torque allocation calculating section 58 in the torque management section 43, via the HVECU 35. The MOTECU 33 calculates the motor real torque which is actually output from the motor M based on the input torque value, and inputs to the third adding section 68 in the torque management section 43, via the HVECU 35.

Moreover, the real torque value calculated in the real torque calculating section 69 is input to the AT-CPU 47, and based on this real torque value, the oil pressure which drives the lock-up clutch 21 is electronically controlled by an LC linear solenoid.

Here, each torque value calculated in the torque management section 43 is corrected according to the ignition timing, the air-fuel ratio, whether fuel cut is enabled or disabled (fuel supply stop), and the like, of the internal combustion engine E, which are controlled by the control unit 42.

A control apparatus for a hybrid vehicle according to the present embodiment has the above-described construction. Next is a description of the operation of this control apparatus for a hybrid vehicle, in particular, the operation for setting crank end torque, that is the torque at the end of the crank shaft (crank end) capable of being output from the power plant.

Figure 3:
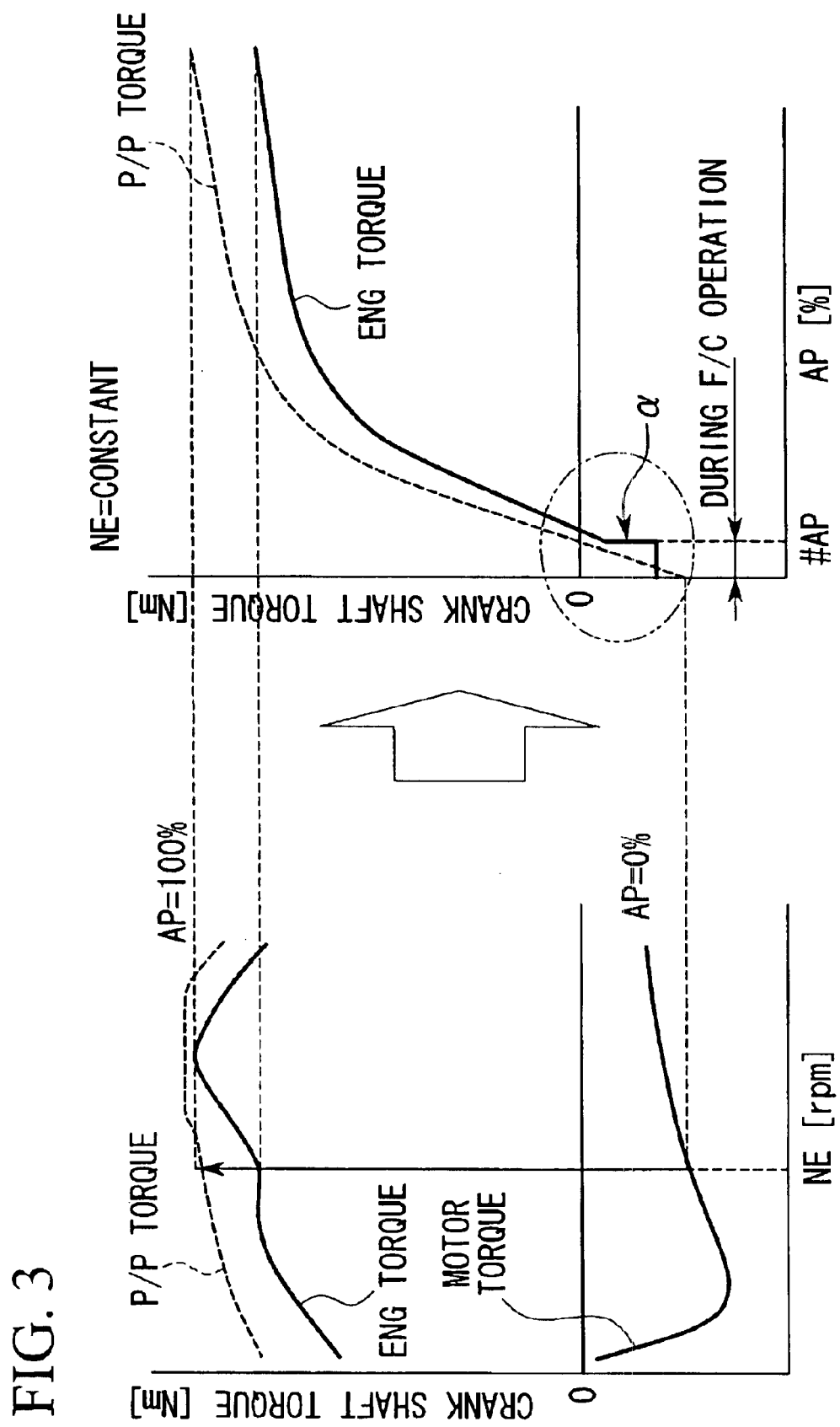
FIG. 3 is a graph showing crank shaft torque, which changes according to the engine speed and accelerator pedal opening.

Here, the crank shaft torque, that is the power plant (P/P) torque input from the power plant to the transmission T, changes according to the engine speed NE and the accelerator pedal opening AP as shown in FIG. 3 for example.

For an internal combustion engine E to which fuel is cut (F/C: fuel supply stop) in the case where the accelerator pedal opening AP is a predetermined opening #AP or less, before and after resuming the fuel supply followed by reversion (F/C reversion) from this fuel cut state (F/C), that is the restart of the internal combustion engine E, a torque difference a, which is a rapid change in response to the change of the accelerator pedal opening AP, occurs in the ENG torque output from the internal combustion engine E as shown in FIG. 3 for example.

Therefore, the FI/AT/MGECU 36 of the control unit 1 sets the operation state of the motor M to control such that a rapid change occurring in the ENG torque is absorbed by the motor torque output from the motor M, and the P/P torque changes smoothly in response to the accelerator pedal opening AP.

Here, in FIG. 3, the torque on the normal rotation side of the driving wheels W is positive.

Figure 4:
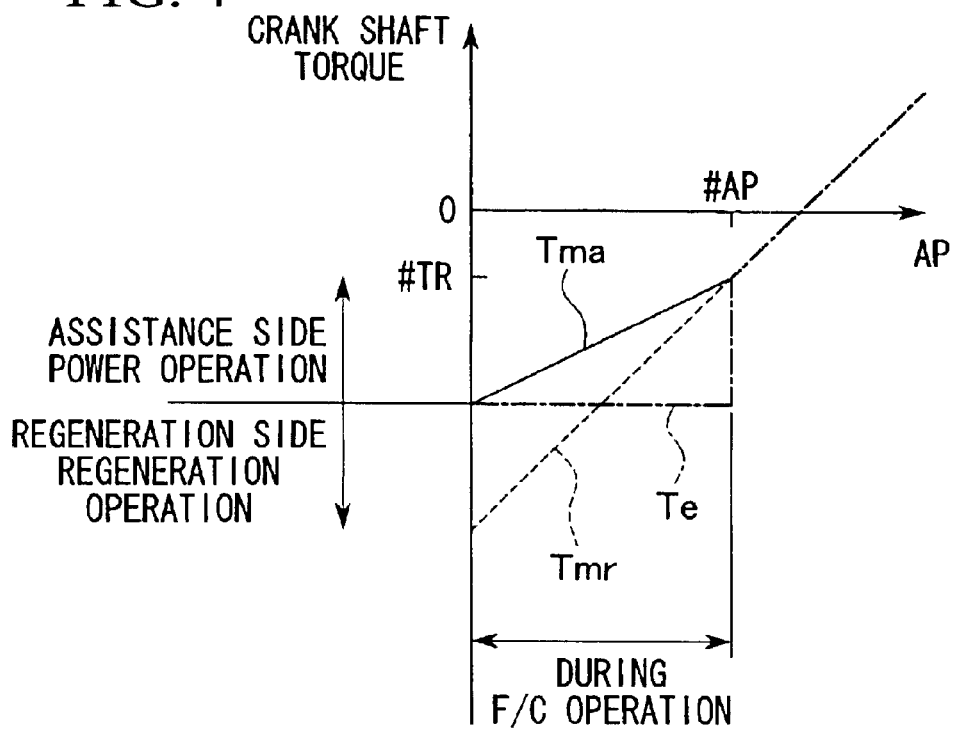
FIG. 4 is a graph showing ENG torque and motor torque, which change according to the accelerator pedal opening.

In the case where the state of charge SOC of the battery 3 is relatively high, and the HVECU 35 inhibits charging of the battery 3, for example, the FI/AT/MGECU 36 of the control unit 1, as shown in FIG. 4 for example, sets the motor torque to be generated from the drive power of the motor M on the assistance side (solid line Tma in FIG. 4) to be larger than the ENG torque (alternating long and short dashed line Te in FIG. 4) during fuel cut (F/C) operation, sets no motor torque to be generated on the regeneration side (solid line Tmr in FIG. 4), for example, and also sets the P/P torque to change smoothly in response to the accelerator pedal opening AP at the time of F/C reversion. For example, in the case where the operation of the motor M is stopped during F/C reversion, the torque values #TR of the ENG torque and the motor torque corresponding to a predetermined accelerator pedal opening #AP at the time of F/C reversion are set to be equal.

Figure 5:
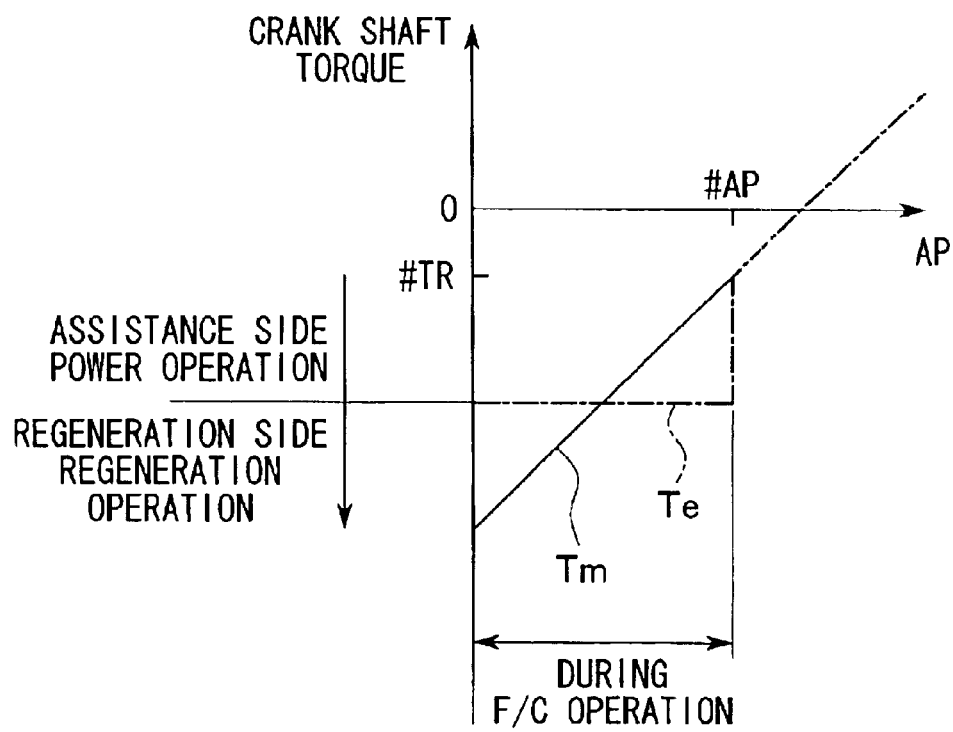
FIG. 5 is a graph showing ENG torque and motor torque, which change according to the accelerator pedal opening.

Whereas, in the case where the HVECU 35 allows charging of the battery 3, as shown in FIG. 5, the FI/AT/MGECU 36 of the control unit 1 sets the motor M to regenerate, whereby it generates a regeneration amount according to the state of charge SOC, and the like, of the battery 3 during fuel cut (F/C) operation, sets the motor torque (solid line Tm in FIG. 5) comprising the torque on the regeneration side, which is smaller than the ENG torque (alternating long and short dashed line Te in FIG. 5) to be generated, and also sets the P/P torque to change smoothly in response to the accelerator pedal opening AP at the time of F/C reversion. For example, in the case where the operation of the motor M is stopped at the time of F/C reversion, the torque values #TR of the ENG torque and the motor torque corresponding to a predetermined accelerator pedal opening #AP at the time of F/C reversion are set to be equal.

Figure 6:
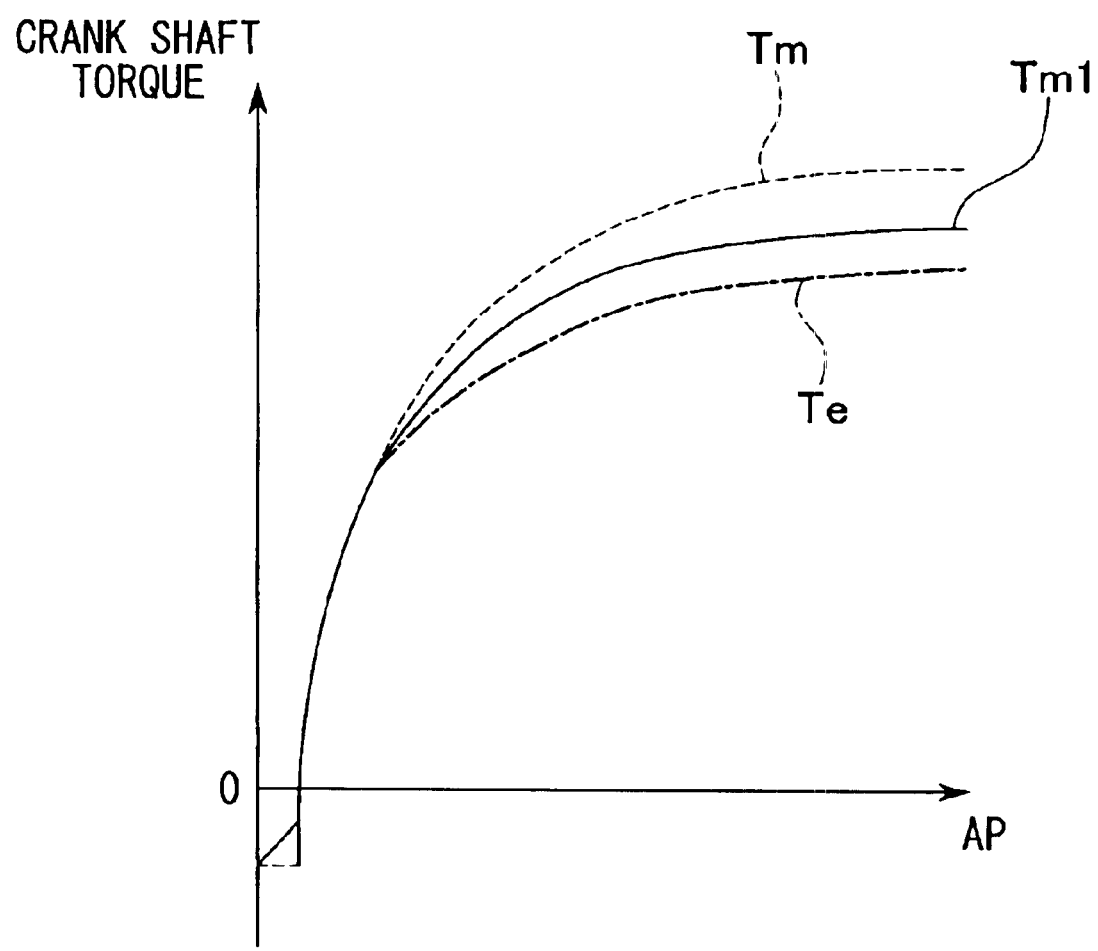
FIG. 6 is a graph showing ENG torque and motor torque, which change according to the accelerator pedal opening.

Furthermore, in the case where the state of charge SOC of the battery 3 is relatively small, and the HVECU 35 inhibits discharge from the battery 3, the FI/AT/MGECU 36 of the control unit 1 sets the motor torque (solid line Tm1 in FIG. 6), which changes according to the accelerator pedal opening AP when the motor is providing power, to be lower than the motor torque (dotted line Tm in FIG. 6), which changes according to the accelerator pedal opening AP, in the case where the HVECU 35 does not inhibit discharge from the battery 3 as shown in FIG. 6 for example.

Figure 7:
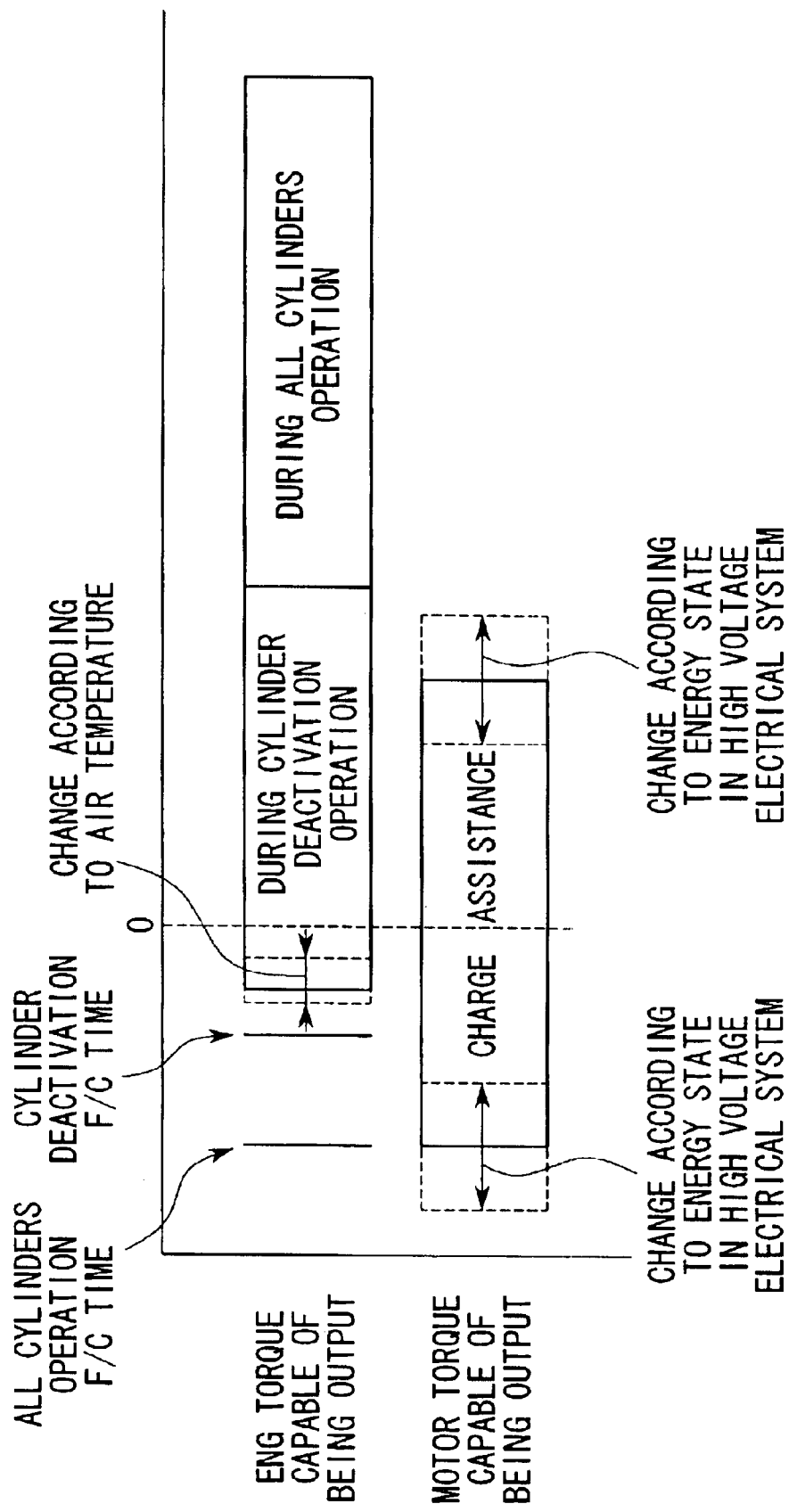
FIG. 7 is a graph showing the ENG torque capable of being output according to the operation state of an internal combustion engine E, and the motor torque capable of being output according to the operation state of a motor M.

Therefore, as shown in FIG. 7 for example, the FI/AT/MGECU 36 sets a torque value and a torque region of the ENG torque capable of being output according to the operating state of the engine E, such as the air temperature, whether fuel cut is enabled or disabled, switching of the cylinder deactivation operation and all cylinders operation, and the like, and sets a torque region of the motor torque capable of being output according to the operating state of the motor M, which changes according to the energy state in the high voltage electrical system, for example, the state of charge SOC of the battery 3, and the like. Then, it allocates the P/P torque required for the torque output from the power plant to a torque instruction for the internal combustion engine E, and to a torque instruction for the motor M so as not to deviate from the torque regions.

Figure 8:
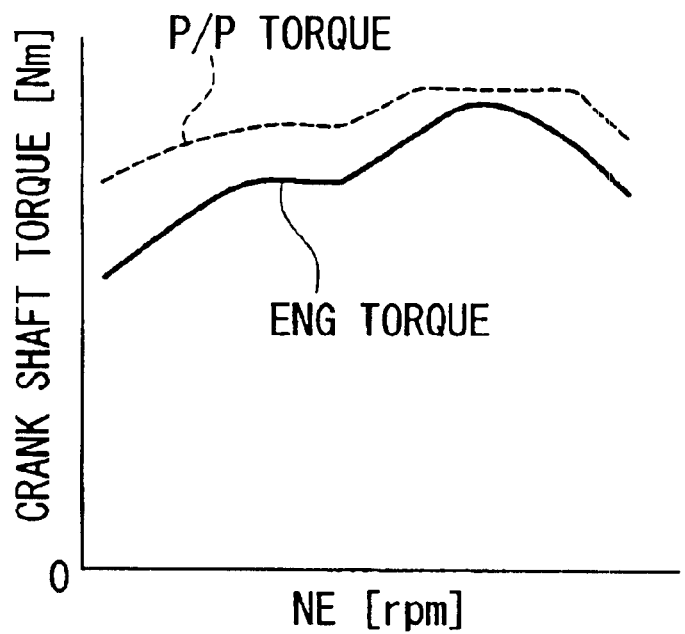
FIG. 8 is a graph showing ENG torque and P/P torque, which change according to the engine speed.
Figure 9:
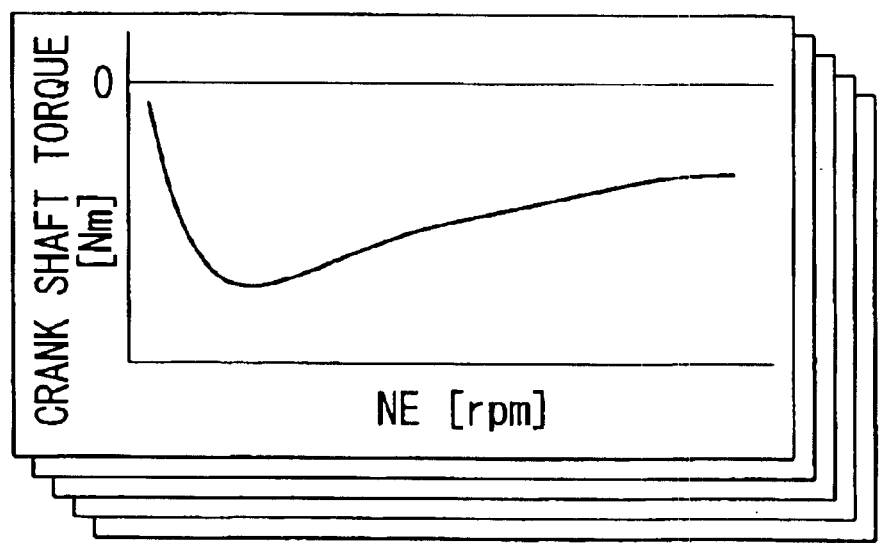
FIG. 9 is a plurality of tables showing the change of motor torque according to the engine speed NE in the case where the accelerator pedal opening AP is fully closed (AP=0%) for each shift position SH.

The FI/AT/MGECU 36 contains a table showing the change of the ENG torque and the P/P torque according to the engine speed NE in the case where the accelerator pedal opening AP is fully open (AP=100%) as shown in FIG. 8, for example, in response to the change of the crank shaft torque according to the engine speed NE and the accelerator pedal opening AP as shown in FIG. 3; for example, and a plurality of tables showing the change of motor torque (for example, at the time of deceleration regeneration of a vehicle, the regeneration torque generated by the regeneration operation of the motor M) according to the engine speed NE in the case where the accelerator pedal opening AP is fully closed (AP=0%) for each shift position SH as shown in FIG. 9, for example.

Figure 10:
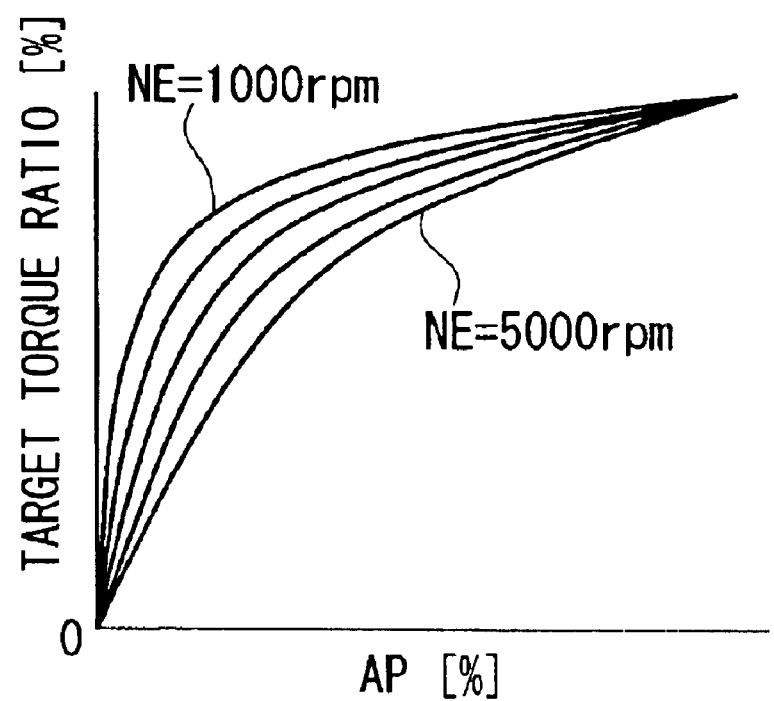
FIG. 10 is a graph showing the target torque ratio, which changes according to the accelerator pedal opening AP, for each predetermined engine speed NE.

The FI/AT/MGECU 36 contains a table in which a P/P torque (target torque when the accelerator pedal is fully open, TQAPMAX, described later) in the case where the accelerator pedal opening AP is fully open (AP=100%) is 100%, a P/P torque (that is, equivalent to the motor torque, and the target torque when the accelerator pedal is fully closed, TQAPMIN, described later) in the case where the accelerator pedal opening AP is fully closed (AP=0%) is 0%, and normalized P/P torque target values (target torque ratio DISAPTQ, described later), which change with a predetermined correspondence relationship according to the accelerator pedal opening AP, as it changes from fully closed to fully open, shown as a percentage, for each predetermined engine speed NE as shown in FIG. 10, for example.

Figure 11:
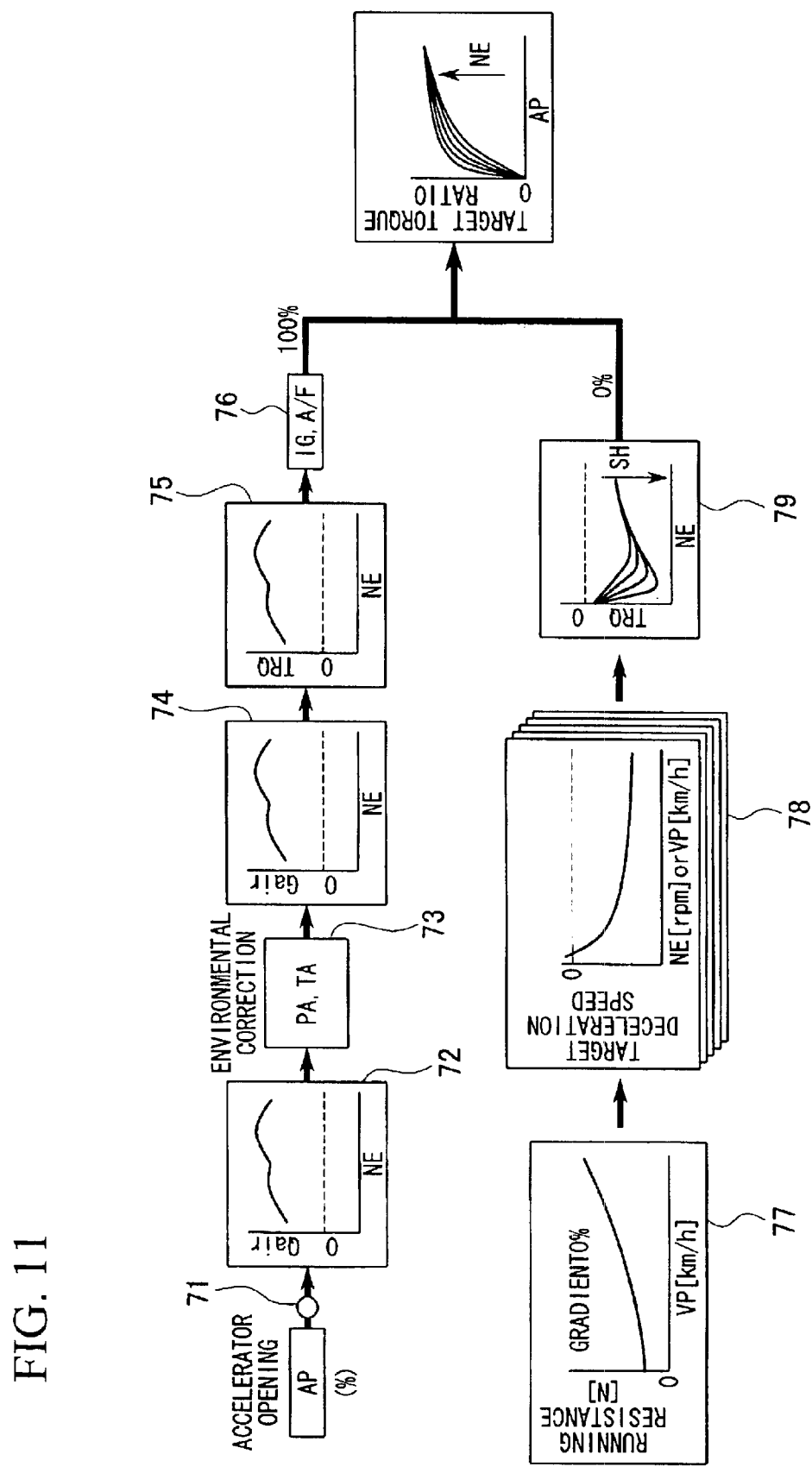
FIG. 11 is a block diagram showing the processing which produces a graph showing the target torque ratio, which changes according to the accelerator pedal opening AP, for each predetermined engine speed NE, shown in FIG. 10.

Here, when calculating the P/P torque (target torque when the accelerator pedal is fully open, TQAPMAX, described later) in the case where the accelerator pedal opening AP is fully open (AP=100%), for example, the FI/AT/MGECU 36 sets a correction coefficient, or the like, in advance for performing appropriate correction to the P/P torque associated with the running characteristics of the vehicle according to the accelerator pedal opening AP output from the accelerator pedal opening sensor S5, the speed VP output from the speed sensor S1, and the like, for example, in a driving sensation correction section 71 as shown in FIG. 11, for example.

Next, a table of the maximum value of intake air volume flow QAIR (L/s), which changes according to the engine speed NE and is preset, is retrieved in a QAIR retrieval section 72, and is set as the maximum intake air volume flow QAIRMAX.

Then, in an environmental correction section 73, environmental correction according to the atmospheric pressure PA, temperature (for example, engine intake air temperature TA), and the like, is performed on the maximum intake air volume flow QAIRMAX obtained by table retrieval, based on a predetermined mathematical equation, for example.

Next, in a GAIR calculation section 74, a maximum intake air mass flow GAIRMAX (g/s) is calculated by variable transformation.

Next, in a P/P torque calculation section 75, the P/P torque, which is preset and changes according to the preset maximum intake air mass flow GAIRMAX, is retrieved from a table to calculate the P/P torque capable of being output.

Furthermore, in an IG correction section 76, corrections are made to the P/P torque retrieved in relation to the ignition timing, air-fuel ratio (A/F) and the like at ignition (IG) based on predetermined mathematical equations, for example, and the P/P torque (target torque when the accelerator pedal is fully open, TQAPMAX, described later) is calculated in the case where the accelerator pedal opening AP is fully open (AP=100%).

Moreover, when calculating the P/P torque (target torque when the accelerator pedal is fully closed, TQAPMIN, described later) in the case where the accelerator pedal opening AP is fully closed (AP=0%), for example, the FI/AT/MGECU 36, as shown in FIG. 11, firstly calculates vehicle running resistances in advance (for example, aerodynamic drag, and rolling resistance), which change according to the speed VP along a path of a predetermined gradient (for example, gradient 0%), based on a predetermined running resistance calculation constant #A_RL, a running resistance calculation primary coefficient #B_RL, a running resistance calculation second coefficient #C_RL, and speed VP, in a running resistance calculation section 77 as shown in the following mathematical equation (1), for example.

[Mathematical Equation 1]

$$RLCAR = \#C\_RL \times VP^2 + \#B\_RL \times VP^2 + \#A\_RL \quad (1)$$

Next, in a target deceleration (G) calculation section 78, a target deceleration GDECOBJ, which changes according to the engine speed NE (or speed VP) for each shift position SH is retrieved from a table.

Then, in a regeneration torque calculation section 79, based on the target deceleration GDECOBJ retrieved, the running resistance RLCAR, the transmission efficiency #EFI_GTM of the transmission T, the gear ratio RATIOTOA, and the like, a deceleration torque (that is regeneration torque), being a crank end torque TDEC, is calculated, and this deceleration torque is set as the P/P torque (target torque when the accelerator pedal is fully closed, TQAPMIN, described later) capable of being output.

Here, the deceleration force FDEC of the vehicle is calculated as shown in the following numerical expression (2) based on the vehicle body #WBODYM for example, the crank end torque TDEC is calculated as shown in the following numerical expression (3) based on the radius of motion #RTIREM of the driving wheels W, for example, and last, the crank end torque TDEC is calculated by the following numerical expression (4) based on the following numerical expressions (1) to (3), and this crank end torque TDEC is set as the target torque when the accelerator pedal is fully closed TQAPMIN.

[Mathematical Equation 2]

$$FDEC = RLCAR - \#GRAVITY \times GDECOBJ \times \#WBODYM \quad (2)$$

[Mathematical Equation 3]

$$TDEC = FDEC \times RTIREM/RATIOTOA/\#EFI\_GTM \quad (3)$$

[Mathematical Equation 4]

$$TDEC = (RLCAR - \#GRAVITY \times GDECOBJ \times \#WBODYM) \times RTIREM/RATIOTOA/\#EFI\_GTM \quad (4)$$

Hereunder is a description of the operation of the control apparatus for a hybrid vehicle according to the present embodiment with reference to flow charts.

Figure 12:
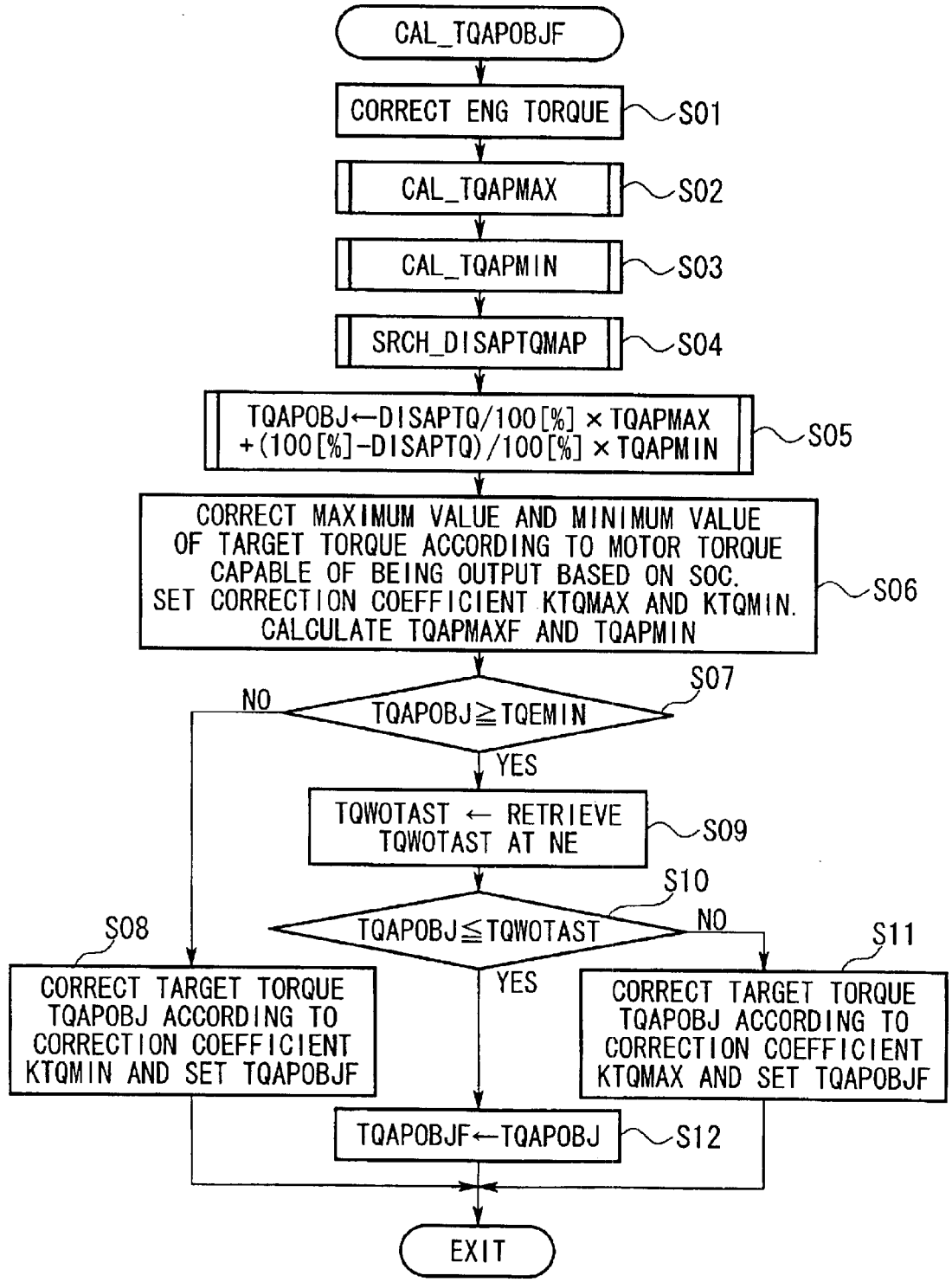
FIG. 12 is a flow chart illustrating the operation of a control apparatus for a hybrid vehicle of the present embodiment shown in FIG. 1.

Firstly, in step S01 shown in FIG. 12, the ENG torque capable of being output from the internal combustion engine E and torques associated with the ENG torque are corrected based on any one of the following pieces of information: atmospheric pressure detected by an atmospheric pressure sensor (not shown in the figure), intake air temperature detected by an intake air temperature sensor (not shown in the figure), and ignition timing, air-fuel ratio and fuel properties (for example, octane number and the like) set by the FI/AT/MGECU 36.

Next, in step S02, a calculation process CAL_TQAPMAX is performed of the target torque when the accelerator pedal is fully open TQAPMAX (Nm), described later, in the case where the accelerator pedal opening AP is 100%.

Next, in step S03, a calculation process CAL_TQAPMIN is performed of the target torque when the accelerator pedal is fully closed TQAPMIN (Nm), described later in the case where the accelerator pedal opening AP is 0%.

Next, in step S04, the target torque ratio DISAPTQ (%) is retrieved, based on the accelerator pedal opening AP and the engine speed NE, from a map of target torque ratio DISAPTQ (%), which indicates the target value of the P/P torque that corresponds by a ratio of one to one with the accelerator pedal opening AP varying from fully closed to fully open, and changes smoothly as shown in FIG. 10 for example, normalized as a percentage, where the minimum value of this target value (that is the target torque when the accelerator pedal is fully closed TQAPMIN) is 0%, and the maximum value (that is the target torque when the accelerator pedal is fully open TQAPMAX) is 100%, for each predetermined engine speed NE.

Next, in step S05, based on the target torque when the accelerator pedal is fully open TQAPMAX, the target torque when the accelerator pedal is fully closed TQAPMIN, and the target torque ratio DISAPTQ (%), a value obtained by dividing the target torque ratio DISAPTQ (%) by 100(%) and multiplying the value obtained by the target torque when the accelerator pedal is fully open TQAPMAX, and a value obtained by subtracting the target torque ratio DISAPTQ (%) from 100(%) and dividing the value obtained by 100(%) and by multiplying the obtained value by the target torque when the accelerator pedal is fully closed TQAPMIN (Nm), are added, and by setting the obtained value as the target torque TQAPOBJ (Nm), being the target value of the P/P torque, the target torque TQAPOBJ (Nm) corresponding linearly to the target torque ratio DISAPTQ (%) is calculated.

Next, in step S06, a high load side correction coefficient KTQMAX, and a low load side correction factor KTQMIN, which correct the maximum value TQAPMAX and the minimum value TQAPMIN of the target torque TQAPOBJ for the P/P torque according to the motor torque capable of being output from the motor M, which is set based on the energy state of the high voltage electrical system, and the state of charge SOC of the battery 3, are set, and the maximum value and the minimum value of the target torque TQAPOBJ are corrected by the correction factors KTQMAX and KTQMIN to calculate the target torque maximum value TQAPMAXF and the target torque minimum value TQAPMINF.

Here, the correction coefficients KTQMAX and KTQMIN are set based on at least one of the following pieces of information: the state of charge SOC of the battery 3, each of the temperatures TBAT, TPDU and TDV, which are detected by temperature sensors S8, S11 and S12, the temperature of the motor M estimated by the HVECU 35, and the existence or nonexistence of an abnormal state in the high voltage electrical system, estimated by the HVECU 35. That is, the correction coefficients KTQMAX and KTQMRN correct the maximum value and the minimum value of the target torque TQAPOBJ by correcting, in effect, the motor torque capable of being output from the motor M.

Figure 13:
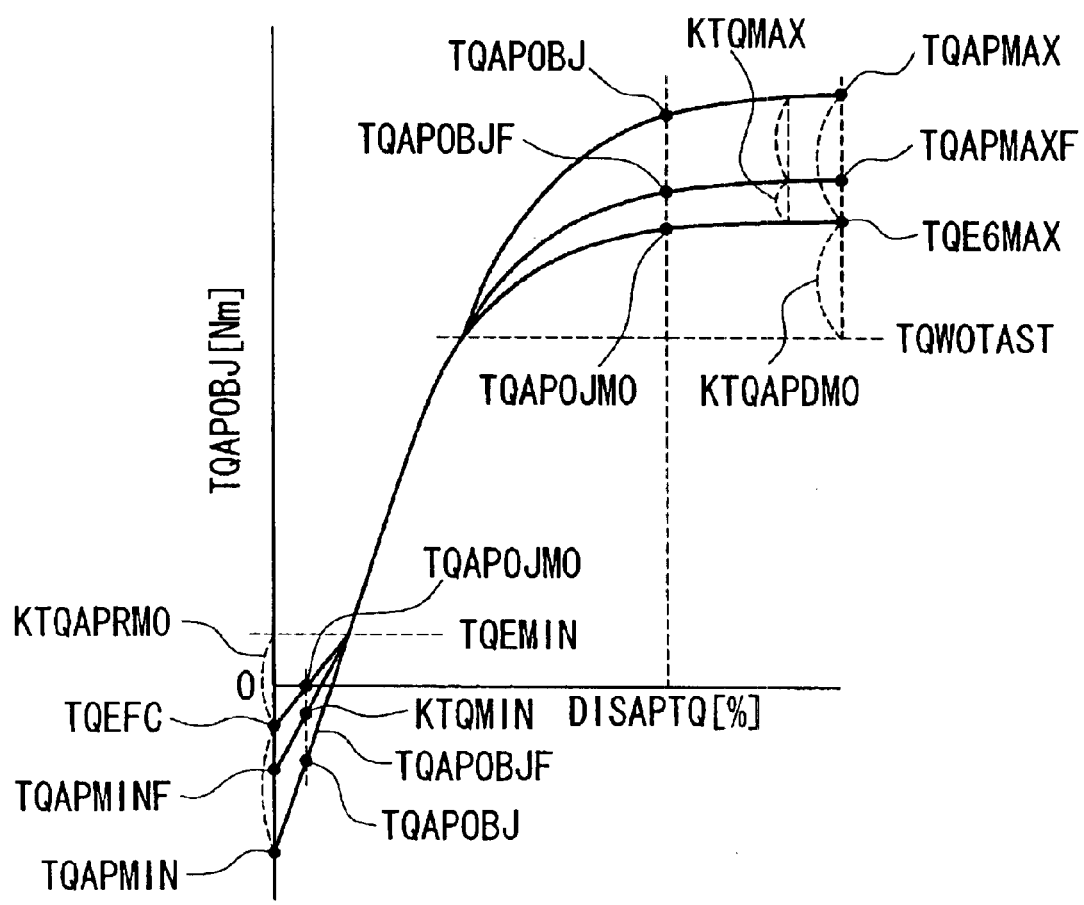
FIG. 13 is a graph showing target torque TQAPOBJ, which changes according to a target torque ratio DISAPTQ.

Then, the high load side correction coefficient KTQMAX corrects such that the maximum value TQAPMAX of the target torque TQAPOBJ is lower, as shown in FIG. 13 for example, and the low load side correction coefficient KTQMIN corrects such that the minimum value TQAPMIN of the target torque TQAPOBJ is higher, as shown in FIG. 13 for example.

Next, in step S07, it is determined whether or not the target torque TQAPOBJ is greater than or equal to a predetermined ENG minimum torque TQEMIN.

In the case where this determination is "YES", the flow proceeds to step S09 as described later.

On the other hand, in the case where this determination is "NO", the flow proceeds to step S08.

Here, the ENG minimum torque TQEMIN is set such that it changes appropriately according to the engine speed NE for either cylinder deactivation operation or all cylinders operation of the internal combustion engine E.

In step S08, as shown in FIG. 13, in the region where the target torque TQAPOBJ is less than a predetermined ENG minimum torque TQEMIN, the low load side correction coefficient KTQMIN corrects the target torque TQAPOBJ to be higher in order to set the target torque final value TQAPOBJF, and the series of processing is terminated.

In step S09, a map showing the change of the WOT assistance start torque TQWOTAST according to the engine speed NE, which is preset, for example is looked up, and the WOT assistance start torque TQWOTAST is calculated.

Here, the WOT assistance is a high load assistance for assisting the output of the motor M in a high load region of the internal combustion engine E, and it is set to operate in the case where the throttle opening associated with the driver's accelerator operation amount exceeds a predetermined assist trigger threshold, for example.

Then, in step S10, it is determined whether or not the target torque TQAPOBJ is less than or equal to the WOT assistance start torque TQWOTAST.

Then in the case where this determination is "YES", the flow proceeds to step S11 described later.

On the other hand, in the case where this determination is "NO", the flow proceeds to step S10.

In step S11, as shown in FIG. 13 for example, in the region where the target torque TQAPOBJ is higher than the predetermined WOT assistance start torque TQWOTAST, the target torque TQAPOBJ is corrected so as to make it lower by the high load side correction coefficient KTQMAX to set the target torque final value TQAPOBJF, and the series of processing is terminated.

Furthermore, in step S12, as shown in FIG. 13 for example, in the region where the target torque TQAPOBJ is greater than or equal to the ENG minimum torque TQEMIN, and less than or equal to the WOT assistance start torque TQWOTAST, it is determined that the degree of freedom when setting the ENG torque capable of being output from the internal combustion engine E, and the motor torque capable of being output from the motor M, is high for example. Hence, the target torque TQAPOBJ is not corrected, and is set as the target torque final value TQAPOBJF, and the series of processing is terminated.

Hereunder is a description of the calculation process CAL_TQAPMAX of the target torque when the accelerator pedal is fully open, TQAPMAX in step S02 described above.

Figure 14:
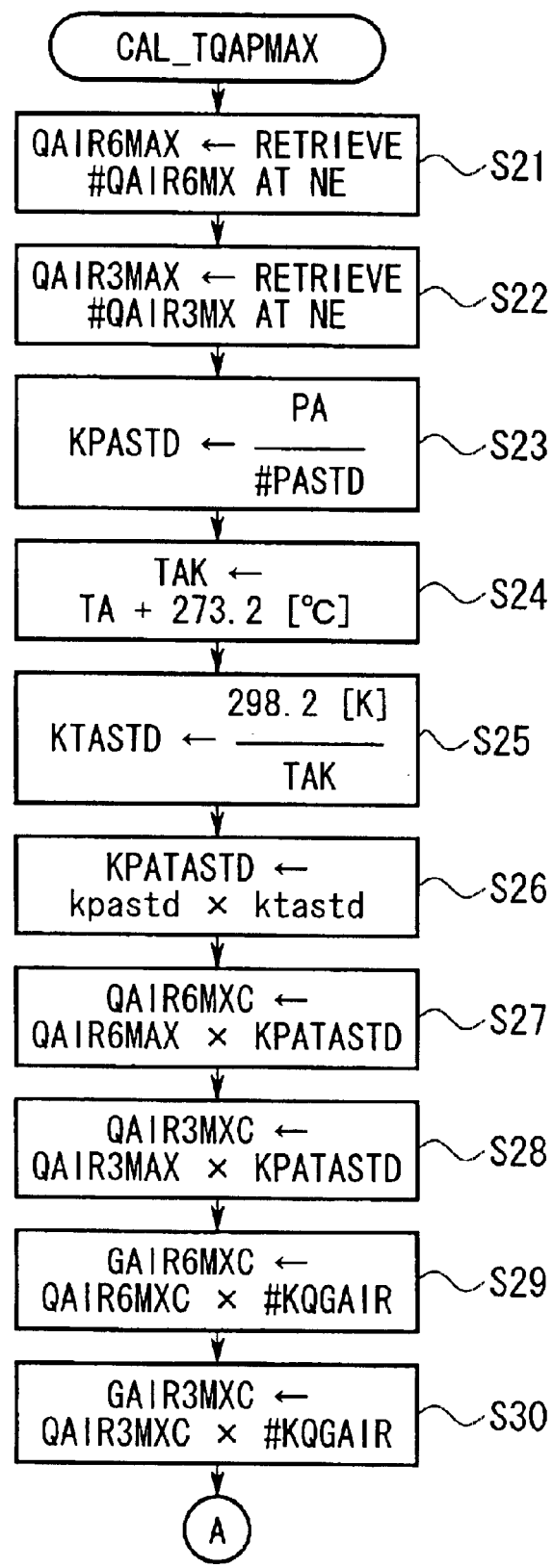
FIG. 14 is a flow chart showing the calculation processing of the target torque when the accelerator pedal is fully open TQAPMAX shown in FIG. 12.

Firstly, in step S21 shown in FIG. 14, the maximum intake air volume flow QAIR6MX at the time of all cylinders operation, which changes according to the engine speed NE, is retrieved from a table, and is set as the all cylinders operation time maximum intake air volume flow QAIR6MAX.

Next, in step S22, the maximum intake air volume flow QAIR3MX at the time of cylinder deactivation operation, which changes according to the engine speed NE, is retrieved from a table, and is set as the cylinder deactivation time maximum intake air volume flow QAIR3MAX.

Next, in step S23, the atmospheric pressure PA detected by the atmospheric pressure sensor (not shown in the figure) is divided by a predetermined standard atmospheric pressure PASTD, and the value obtained is set as a PA standard atmospheric pressure conversion factor KPASTD.

Next, in step S24, the units of the engine inlet gas temperature TA (C°) detected by the engine air flow meter (AFM) 66 are converted, for example, to calculate a control engine inlet gas temperature TAK (K).

Next, in step S25, the value obtained by dividing a predetermined standard temperature (for example, 298.2K) by the control engine inlet gas temperature TAK, is set as the TA standard atmospheric pressure conversion factor KTASTD.

Next, in step S26, the value obtained by multiplying the PA standard atmospheric pressure conversion factor KPASTD and the TA standard atmospheric pressure conversion factor KTASTD, is set as a PA, TA standard state conversion factor KPATASTD.

Next, in step S27, the value obtained by multiplying the all cylinders time maximum intake air volume flow QAIR6MAX and the PA, TA standard state conversion factor KPATASTD, is set as an all cylinders time maximum intake air volume flow after standard state conversion, QAIR6MXC.

Next, in step S28, the value obtained by multiplying the cylinder deactivation time maximum intake air volume flow QAIR3MAX and the PA, TA standard state conversion factor KPATASTD, is set as a cylinder deactivation time maximum intake air volume flow after standard state conversion, QAIR3MXC.

Next, in step S29, the value obtained by multiplying the all cylinders time maximum intake air volume flow QAIR6MXC and a predetermined conversion factor KQGAIR, is set as an all cylinders time maximum intake air volume flow GAIR6MXC.

Next, in step S30, the value obtained by multiplying the cylinder deactivation time maximum intake air volume flow QAIR3MXC and the predetermined conversion factor KQGAIR, is set as a cylinder deactivation time maximum intake air volume flow GAIR3MXC.

Then, in step S31, by retrieval from a map of predetermined torque, each of the maximum ENG torques TQE3MAX and TQE6MAX, being the maximum values of the ENG torque capable of being output from the internal combustion engine E, each of the torque control maximum values TQE3MXHI and TQE6MXHI due to ignition on the high octane side, and each of the torque control minimum values TQE3MXLO and TQE6MXLO, are set respectively for both cylinder deactivation operation and all cylinders operation of the internal combustion engine E.

Next, in step S32, the average value of the target air-fuel ratio KCMD for one bank comprising three cylinders capable of cylinder deactivation operation of the internal combustion engine E, and the target air-fuel ratio KCMDB2 for the other bank comprising three cylinders, which does not perform cylinder deactivation operation, is calculated, and it is set as the average target air-fuel ratio value KCMDCENT. Here, the target air-fuel ratios KCMD and KCMDB2 are in inverse proportion to the air-fuel ratio (A/F), that is the fuel-air ratio (F/A), and the value corresponding to the theoretical air fuel ratio is 1.0.

Next, in step S33, using the target air-fuel ratio average value KCMDCENT, a torque correction coefficient #KTRQKCM, which changes according to the preset target air-fuel ratio, is retrieved from a table, and is set as the all cylinders time KCMD torque correction coefficient at the time of all cylinders operation, KTQ6KCMD.

Next, in step S34, using the target air-fuel ratio KCMDB2, a torque correction coefficient #KTRQKCM, which changes according to the preset target air-fuel ratio, is retrieved from a table, and is set as the cylinder deactivation time KCMD torque correction coefficient during cylinder deactivation operation, KTQ63KCMD.

Next, in step S35, an all cylinders operation time actual engine torque after knocking correction, TRQ6, is calculated based on a retardation calculation coefficient KIGKN associated with retardation (for example, amount of ignition timing delay) for suppressing knocking occurring in the internal combustion engine E, which is output from a knocking sensor (not shown in the figure), the all cylinders time high octane side torque control maximum value, TQE6MXHI, and the all cylinders time low octane side torque control minimum value, TQE6MXLO.

Next, in step S36, a cylinder deactivation operation time actual engine torque after knocking correction, TRQ3, is calculated based on: a retardation calculation coefficient KIGKN associated with retardation (for example, amount of ignition timing delay) for suppressing knocking occurring in the internal combustion engine E, which is output from a knocking sensor (not shown in the figure), the cylinder deactivation time high octane side torque control maximum value, TQE3MXHI, and the cylinder deactivation time low octane side torque control minimum value, TQE3MXLO.

Next, in step S37, the value obtained by multiplying the all cylinders operation time actual engine torque after knocking correction, TRQ6, and the all cylinders time KCMD torque correction coefficient KTQ6KCMD, is set as the all cylinders time maximum ENG torque TQE6MAX.

Next, in step S38, the value obtained by multiplying the cylinder deactivation operation time actual engine torque after knocking correction, TRQ3, and the cylinder deactivation time KCMD torque correction coefficient KTQ3KCMD, is set as the cylinder deactivation time maximum ENG torque TQE3MAX.

Next, in step S39, a WOT assistance time maximum motor torque #TQMWOT, which changes according to the engine speed NE, is retrieved from a table, and set as the WOT assistance time maximum motor torque TQMWOT.

Next, in step S40, the value obtained by adding the all cylinders time maximum ENG torque TQE6MAX and the WOT assistance time maximum motor torque TQMWOT, is set as the target torque when the accelerator pedal is fully open TQAPMAX, and the series of processing is terminated.

Hereunder is a description of the calculation process CAL_TQAPMIN of the target torque when the accelerator pedal is fully closed TQAPMIN in step S03 described above.

Figure 15:
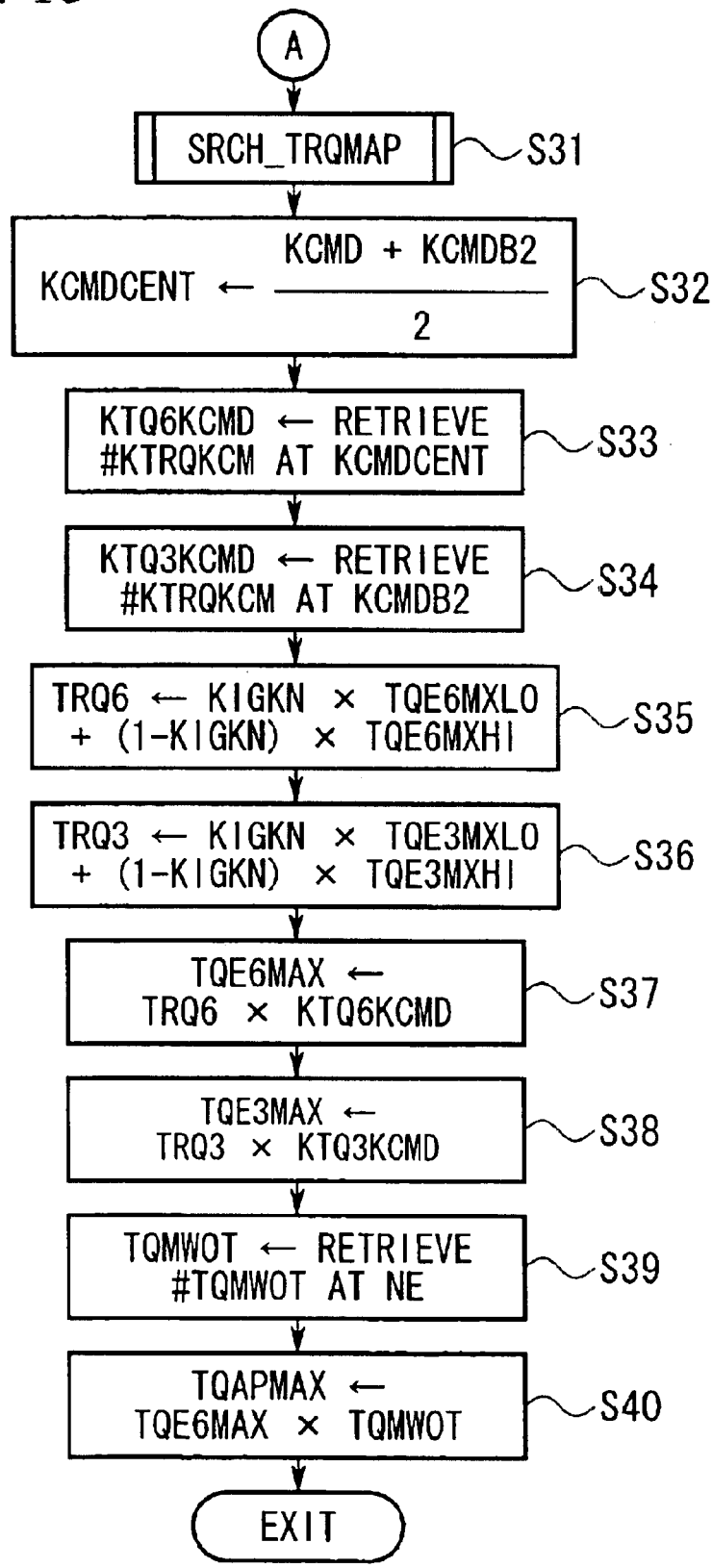
FIG. 15 is a flow chart showing the calculation processing of the target torque when the accelerator pedal is fully open TQAPMAX shown in FIG. 12.
Figure 16:
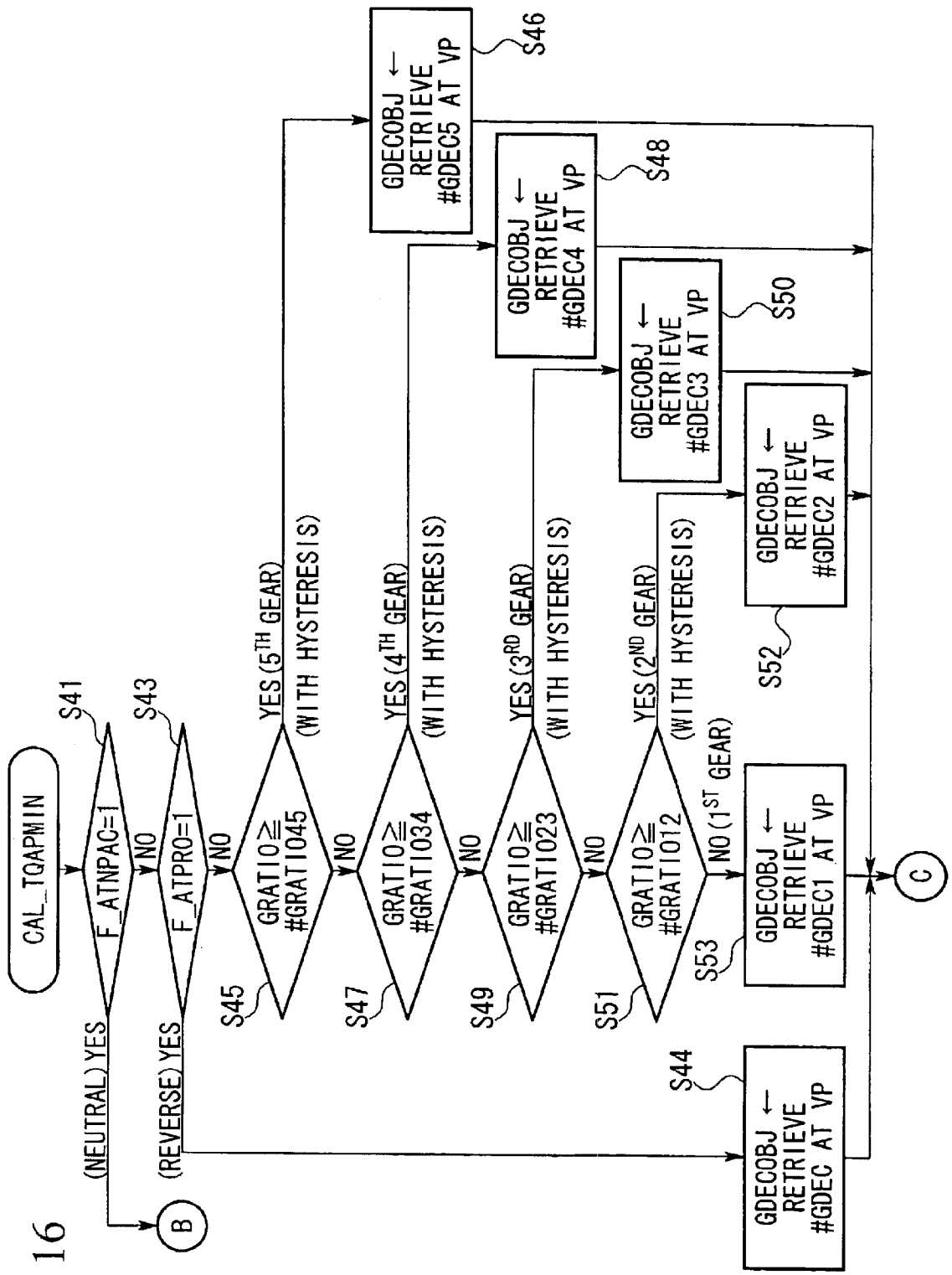
FIG. 16 is a flow chart showing the calculation processing of the target torque when the accelerator pedal is fully closed TQAPMIN shown in FIG. 12.
Figure 17:
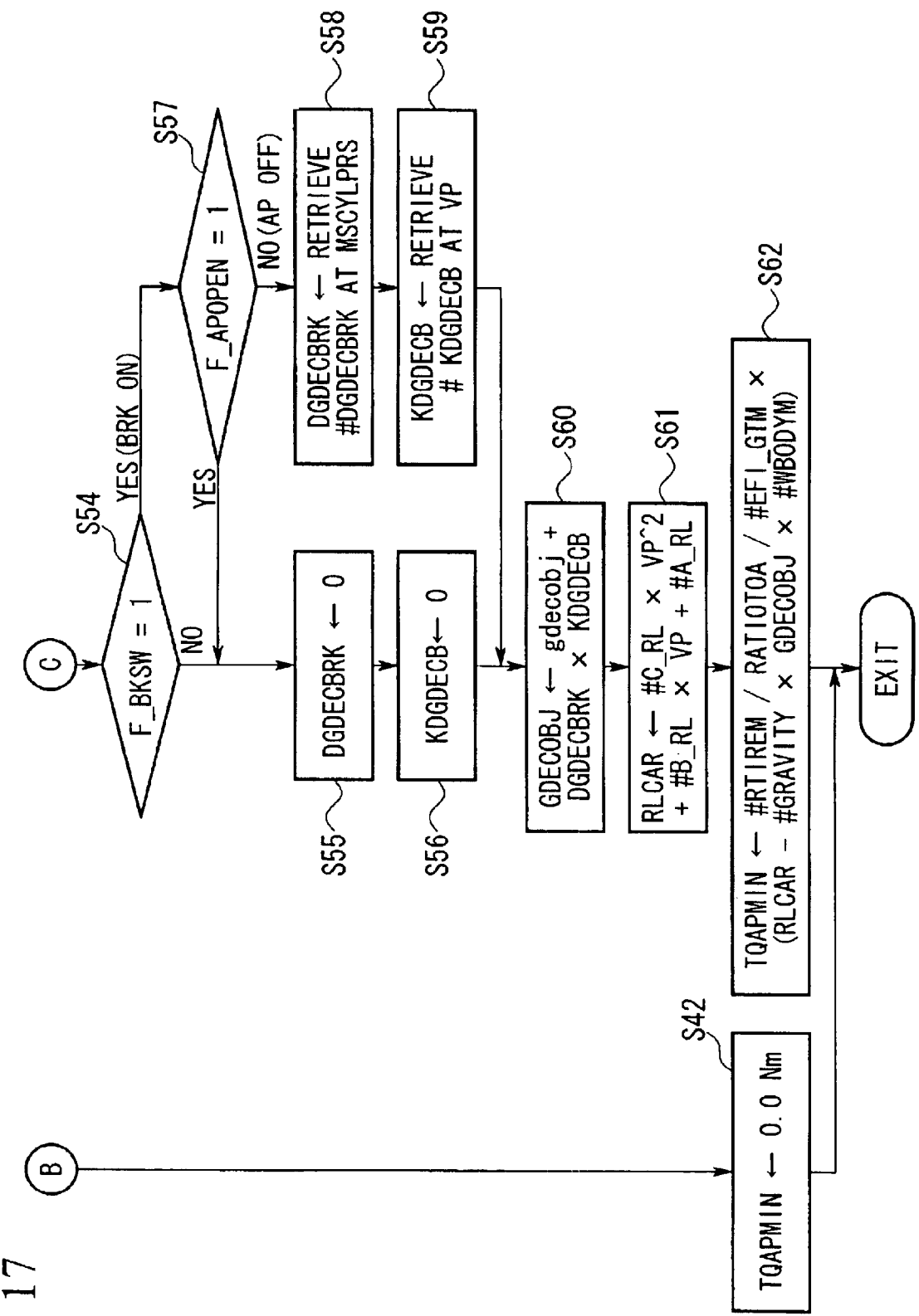
FIG. 17 is a flow chart showing the calculation processing of the target torque when the accelerator pedal is fully closed TQAPMIN shown in FIG. 12.

Firstly, in step S41 shown in FIG. 15, it is determined whether the flag of the neutral position determination flag F_ATNPAC is "1" or not.

In the case where this determination is "YES" (neutral position), the flow proceeds to step S42, the target torque when the accelerator pedal is fully closed TQAPMIN is set to zero, and the series of processing is terminated.

On the other hand, in the case where this determination is "NO" (in gear), the flow proceeds to step S43.

In step S43, it is determined whether the value of the reverse position determination flag F_ATPRO is "1" or not.

In the case where this determination is "YES" (reverse position), the flow proceeds to step S44, the reverse time target deceleration #GDECR, which changes according to the speed VP for example, is retrieved from a table and set as the target deceleration GDECOBJ, and the flow proceeds to step S54 described later.

On the other hand, in the case where this determination is "NO" (other than reverse position), the flow proceeds to step S45.

Next, in step S45, it is determined whether or not the gear ratio GRATIO output from the AT-CPU47 of the FI/AT/MGECU 36 is greater than or equal to a predetermined fourth gear to fifth gear ratio threshold #GRATIO 45 associated with the gear ratio between the gear ratio when shift position SH is in fifth gear and the gear ratio in fourth gear.

In the case where this determination is "YES" (the shift position SH is in fifth gear), the flow proceeds to step S46, the target deceleration in fifth gear, #GDEC5, which changes according to the speed VP for example, is retrieved from a table and set as the target deceleration GDECOBJ, and the flow proceeds to step S54 described later.

On the other hand, in the case where this determination is "NO" (shift position SH is in other than fifth gear), the flow proceeds to step S47.

Next, in step S47, it is determined whether or not the gear ratio GRATIO output from the AT-CPU47 of the FI/AT/MGECU 36 is greater than or equal to a predetermined third gear to fourth gear ratio threshold #GRATIO 34 associated with the gear ratio between the gear ratio when the shift position SH is in fourth gear and the gear ratio in third gear.

In the case where this determination is "YES" (shift position SH is in forth gear), the flow proceeds to step S48, the target deceleration in fourth gear, #GDEC4, which changes according to the speed VP for example, is retrieved from a table, is set as the target deceleration GDECOBJ, and the flow proceeds to step S54 described later.

On the other hand, in the case where this determination is "NO" (shift position SH is in other than fourth gear), the flow proceeds to step S49.

Next, in step S49, it is determined whether or not the gear ratio GRATIO output from the AT-CPU47 of the FI/AT/MGECU 36 is greater than or equal to a predetermined second gear to third gear ratio threshold #GRATIO 23 associated with the gear ratio between the gear ratio when the shift position SH is in third gear and the gear ratio in second gear.

In the case where this determination is "YES" (shift position SH is in third gear), the flow proceeds to step S50, the target deceleration in third gear, #GDEC3, which changes according to the speed VP for example, is retrieved from a table, is set as the target deceleration GDECOBJ, and the flow proceeds to step S54 described later.

On the other hand, in the case where this determination is "NO" (shift position SH is in other than third gear), the flow proceeds to step S51.

Next, in step S51, it is determined whether or not the gear ratio GRATIO output from the AT-CPU47 of the FI/AT/MGECU 36 is greater than or equal to a predetermined first gear to second gear ratio threshold #GRATIO 12 associated with the gear ratio between the gear ratio when shift position SH is in second gear and the gear ratio in first gear.

In the case where this determination is "YES" (shift position SH is in second gear), the flow proceeds to step S52, the target deceleration in second gear, #GDEC2, which changes according to the speed VP for example, is retrieved from a table, is set as the target deceleration GDECOBJ, and the flow proceeds to step S54 described later.

On the other hand, in the case where this determination is "NO" (shift position SH is in first gear), the flow proceeds to step S51, the target deceleration in first gear, #GDEC1, which changes according to the speed VP for example, is retrieved from a table, and set as the target deceleration GDECOBJ, and the flow proceeds to step S54 described later.

Then, in step S54, it is determined whether the value of the brake ON determination flag F_BKSW is "1" or not.

In the case where this determination is "YES" (brake on), the flow proceeds to step S57.

On the other hand, in the case where this determination is "NO" (brake OFF), the flow proceeds to step S55.

In step S55, the brake ON time target acceleration addition term DGDECBRK is set to zero.

Next, in step S56, the speed coefficient KDGDECB for changing the brake ON time target acceleration addition term DGDECBRK according to the speed VP is set to zero, and the flow proceeds to step S60.

On the other hand, in step S57, it is determined whether the value of the acceleration operation ON determination flag F_LAPOPEN is "1" or not.

In the case where this determination is "YES" (acceleration operation ON), it is determined that the driver does not have any intention to decelerate for example, and the flow returns to step S55 described above.

On the other hand, in the case where this determination is "NO" (acceleration operation OFF), it is determined that the driver has an intention to decelerate for example, and the flow proceeds to step S58.

Here, the value of the acceleration operation ON determination flag F_APOPEN is set to "1" in the case where the accelerator pedal opening AP associated with the amount of accelerator pedal operation by the driver is greater than or equal to the accelerator pedal opening APIDLE set for the idle operating state of the internal combustion engine E, for example, or in the case where the throttle opening TH set during cruise control is greater than or equal to the throttle opening CCIDLE set for the idle operating state during cruise control.

In step S58, a brake ON time target acceleration addition term #DGDECBRK, which changes according to the master cylinder fluid pressure MSCYLPRS associated with the brake master power negative internal pressure, is retrieved from a table and set as a brake ON time target acceleration addition term DGDECBRK.

Next, in step S59, a speed coefficient #KDGDECB, which changes according to the speed VP is retrieved from a table and set as the speed coefficient #KDGDECB.

Then, in step S60, a value obtained by multiplying the brake ON time target acceleration addition term DGDECBRK and the speed coefficient #KDGDECB is added to the target deceleration GDECCOBJ, and the obtained value is set as a target deceleration GDECCOBJ.

Next, in step S61, a running resistance RLCAR is calculated based on the predetermined running resistance calculation constant #A_RL, the running resistance calculation primary term coefficient #B_RL, the running resistance calculation second term coefficient #C_RL, and the speed VP.

Next, in step S62, a value obtained by multiplying a predetermined unit conversion coefficient #GRAVITY, the target deceleration GDECOBJ, and the vehicle body weight #WBODYM, is subtracted from the running resistance RLCAR, and the obtained value is multiplied by the predetermined radius of motion of the driving wheels W, #RTIREM. Furthermore, the obtained value is divided by the gear ratio RATIOTOA of the transmission T according to the shift position SH, divided by the predetermined transmission efficiency #EFI_GTM of the transmission T, and the obtained value is set as a target torque when the accelerator pedal is fully closed, TQAPMIN, and the series of processing is terminated.

Here, the target torque when the accelerator pedal is fully closed TQAPMIN is calculated as the crank shaft torque input from the power plant to the transmission T.

As described above, according to a control apparatus for a hybrid vehicle of the present embodiment, when setting the target torque TQAPOBJ for the crank end torque according to the accelerator pedal opening AP and the engine speed NE, by changing the target torque TQAPOBJ smoothly over the range of the accelerator pedal opening AP from fully open to fully closed, associated with a driver's accelerator operation amount and the like for example, it is possible to prevent a torque change occurring that an occupant of a vehicle does not expect. Furthermore, the target torque TQAPOBJ is set so as to correspond to the accelerator pedal opening AP by a ratio of one to one. Hence it is possible to reflect the driver's intention appropriately with respect correctly to the traveling behavior of the vehicle.

Moreover, in the case where the target torque TQAPOBJ is greater than or equal to a predetermined ENG minimum torque TQEMIN, and is less than or equal to the WOT assistance start torque TQWOTAST, that is, in the case where the accelerator pedal opening AP is partway open, by the accelerator pedal opening AP and the target torque TQAPOBJ corresponding with a predetermined correspondence relationship of one to one, it is possible to reflect the driver's intention more appropriately with respect correctly to the traveling behavior of a vehicle, regardless of the existence or nonexistence of a correction to the target torque TQAPOBJ at the fully open end or at the fully closed end of the accelerator pedal opening AP.

Furthermore, according to a control apparatus for a hybrid vehicle of the present embodiment, by setting the torque instruction of the internal combustion E and the torque instruction of the motor M by the target torque TQAPOBJ corresponding linearly to the target torque ratio DISAPTQ, which corresponds with the change of the accelerator pedal opening AP associated with the driver's accelerator operation amount by a ratio of one to one and changing smoothly, for example, it is possible to control the internal combustion engine and the motor easily. Moreover, even during fuel cut reversion when fuel supply is resumed to restart the internal combustion engine E from the fuel cut operation state, during which the fuel supply to the internal combustion engine E is temporarily stopped, for example, it is possible to prevent a torque difference occurring whereby the power plant torque changes rapidly, and to reflect the driver's intention with respect the traveling behavior of a vehicle appropriately with good reproducibility, so that the vehicle operability can be improved.

Furthermore, when calculating the target torque when the accelerator pedal is fully open TQAPMAX, by performing environmental correction according to the atmospheric pressure PA and temperature (for example, engine inlet gas temperature TA) and the like, and also by performing correction processes according to the ignition timing, air-fuel ratio (A/F) and the like at ignition (IG), it is possible to improve the calculation accuracy.

Moreover, in the case where a predetermined brake operation by a driver is detected when calculating the target torque when the accelerator pedal is fully closed, TQAPMIN, according to the target deceleration GDECOBJ (in the case where the value of the brake ON determination flag F_BKSW is "1"), by calculating a coefficient to increase the target deceleration GDECOBJ according to the brake master power negative internal pressure and the speed VP, that is an amount to be added to the deceleration regeneration, it is possible to recover regeneration energy efficiently while generating an appropriate deceleration feeling according to the deceleration intention of the driver of the vehicle without any unpleasant sensation.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A control apparatus for a hybrid vehicle which includes an internal-combustion engine and a motor as a power source, and connects at least one of said internal-combustion engine and said motor to driving wheels of the vehicle through a transmission so as to transmit a driving force to said driving wheels, comprising;
   a target torque setting device which sets a target torque with respect to a crank end torque, which is a torque at the end of a crank shaft, of the power plant torque output from the power plant made up of said internal combustion engine and said motor, based on a change of accelerator pedal opening from fully opened to fully closed; and
   a torque allocation device which allocates said target torque corresponding to said accelerator pedal opening, to an engine torque instruction, which is a required value with respect to the output torque from said internal combustion engine, and to a motor torque instruction, which is a required value with respect to the output torque from said motor.

2. A control apparatus for a hybrid vehicle according to claim 1, further comprising an electronically controlled throttle that controls a throttle valve according to said engine torque instruction.

3. A control apparatus for a hybrid vehicle according to claim 1, further comprising an engine torque setting device which sets the torque capable of being output from said internal combustion engine based on at least one of the information on atmospheric pressure, intake air temperature, ignition timing, air-fuel ratio, and fuel properties.

4. A control apparatus for a hybrid vehicle according to claim 1, further comprising a power storage unit which transfers electric energy between it and said motor, and a motor torque setting device which sets the torque capable of being output from said motor based on at least any one of the information on the state of charge of said power storage unit, the temperature of a high voltage electrical system comprising said motor and said power storage unit, and the existence or nonexistence of an abnormal state in said high voltage electrical system.

5. A control apparatus for a hybrid vehicle according to claim 4, further comprising a target torque correction device which reduces said target torque at the fully opened side of said accelerator pedal opening in the case where the torque capable of being output from said motor set by said motor torque setting device, is a value that limits the torque capable of being output during the power running operation of said motor, and increases said target torque at the fully closed side of said accelerator pedal opening in the case where the torque capable of being output from said motor set by said motor torque setting device, is a value that limits the torque capable of being output during the power regenerative operation of said motor.

6. A control apparatus for a hybrid vehicle according to claim 5, further comprising a target torque resetting device which, in the case where said target torque is corrected by said target torque correction device, sets said accelerator pedal opening and said target torque to a predetermined correspondence relationship of one to one, changing smoothly, in a partway open region between the fully opened side of said accelerator pedal opening and the fully closed side.

7. A control apparatus for a hybrid vehicle which includes an internal-combustion engine and a motor as a power source, and connects at least one of said internal-combustion engine and said motor to driving wheels of the vehicle through a transmission so as to transmit a driving force to the driving wheels, comprising:
   a target torque ratio setting device which sets a target torque ratio with respect to a crank end torque, which is a torque at the end of a crank shaft, of a power plant torque output from a power plant made up of said internal combustion engine and said motor, based on a change of an accelerator pedal opening from fully opened to fully closed, where the target value of the crank end torque when said accelerator pedal opening is fully open is 100%, and the target value when said accelerator pedal opening is fully closed is 0%;
   a target torque setting device which sets a target torque corresponding linearly to said target torque ratio, which changes from 0% to 100% based on a target maximum torque, which is the target value of the crank end torque when the accelerator pedal opening is fully opened, and a target minimum torque, which is the target value of the crank end torque when the accelerator pedal opening is fully closed; and
   a torque allocation device which allocates said target torque according to said accelerator pedal opening to an engine torque instruction, which is a required value with respect to the output torque from said internal combustion engine, and to a motor torque instruction, which is a required value with respect to the output torque from said motor.

8. A control apparatus for a hybrid vehicle according to claim 7, further comprising a target maximum torque calculating device which sets a value obtained by adding an output capable maximum torque of said internal combustion engine which changes according to the engine speed, and an output capable maximum torque of said motor which changes according to the motor speed, to said target maximum torque.

9. A control apparatus for a hybrid vehicle according to claim 8, further comprising an internal combustion engine maximum capable output torque calculating device which makes a predetermined correction to a maximum intake air volume of said internal combustion engine, which changes according to the engine speed, based on the atmospheric pressure and the intake air temperature, to calculate a maximum intake air weight, calculates a torque corresponding to the maximum intake air weight, and sets the value obtained by a predetermined correction to the torque based on the ignition timing and the air-fuel ratio, to the output capable maximum torque of said internal combustion engine.

10. A control apparatus for a hybrid vehicle according to claim 7, further comprising a target minimum torque calculation device which calculates a target deceleration according to the transmission gear ratio and the vehicle speed, the transmission gear ratio and the engine speed, or the vehicle speed, and which sets a value obtained by performing a calculation using, the transmission gear ratio, the transmission efficiency and the vehicle running resistance in the target deceleration, to said target minimum torque.

* * * * *